United States Patent
Grant et al.

(10) Patent No.: US 8,232,969 B2
(45) Date of Patent: *Jul. 31, 2012

(54) HAPTIC FEEDBACK FOR BUTTON AND SCROLLING ACTION SIMULATION IN TOUCH INPUT DEVICES

(75) Inventors: Danny A. Grant, Montreal (CA); Pedro Gregorio, Verdun (CA); Robert W. Heubel, San Leandro, CA (US); Christophe Ramstein, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 11/249,031

(22) Filed: Oct. 11, 2005

(65) Prior Publication Data
US 2006/0109256 A1    May 25, 2006

Related U.S. Application Data

(60) Provisional application No. 60/616,648, filed on Oct. 8, 2004.

(51) Int. Cl.
*G06F 3/041* (2006.01)
(52) U.S. Cl. .................................. 345/173; 178/18.07
(58) Field of Classification Search .................. 345/179, 345/156–157, 159, 173–174; 340/407.2; 178/18.03, 18.05, 18.06
See application file for complete search history.

(56) References Cited

U.S. PATENT DOCUMENTS

| | | |
|---|---|---|
| 3,497,668 A | 2/1970 | Hirsh |
| 3,623,046 A | 11/1971 | Scourtes |
| 3,911,416 A | 10/1975 | Feder |
| 4,023,290 A | 5/1977 | Josephson |
| 4,101,884 A | 7/1978 | Benton, Jr. |
| 4,108,164 A | 8/1978 | Hall, Sr. |
| 4,127,752 A | 11/1978 | Lowthorp |
| 4,237,439 A | 12/1980 | Nemoto |
| 4,242,823 A | 1/1981 | Bruno |
| 4,262,240 A | 4/1981 | Arai |
| 4,262,549 A | 4/1981 | Schwellenbach |
| 4,382,217 A | 5/1983 | Horner et al. |

(Continued)

FOREIGN PATENT DOCUMENTS
DE    19613025 A1    3/1996
(Continued)

OTHER PUBLICATIONS

Oakley, Ian, Jussi Angesleva, Stephen Hughes, Sile O'Modhrain; "Tilt and Feel: Scrolling with Vibrotactile Display": Jun. 2004; Proceedings of EuroHaptics '04.*

(Continued)

*Primary Examiner* — Chanh Nguyen
*Assistant Examiner* — Allison Walthall
(74) *Attorney, Agent, or Firm* — Nixon Peabody LLP

(57) ABSTRACT

A planar touch control is used to provide input to a computer and haptic feedback is provided thereto. A touch control includes a touch input device with a planar touch surface that inputs a position signal to a processor associated with the computer based on a location of user implemented contact on the touch surface. The computer can position or modify a cursor or image in a displayed graphical environment based at least in part on the position signal, or perform a different function. At least one actuator is also coupled to the touch input device and outputs a force to provide a haptic sensation to the user via the touch surface.

37 Claims, 20 Drawing Sheets

U.S. PATENT DOCUMENTS

| | | | |
|---|---|---|---|
| 4,414,537 A | 11/1983 | Grimes | |
| 4,414,984 A | 11/1983 | Zarudiansky | |
| 4,422,060 A | 12/1983 | Matsumoto et al. | |
| 4,550,221 A | 10/1985 | Mabusth | |
| 4,557,275 A | 12/1985 | Dempsey, Jr. | |
| 4,581,491 A | 4/1986 | Boothroyd | |
| 4,584,625 A | 4/1986 | Kellogg | |
| 4,692,756 A | 9/1987 | Clark | |
| 4,715,235 A | 12/1987 | Fukui et al. | |
| 4,731,603 A | 3/1988 | McRae et al. | |
| 4,757,453 A | 7/1988 | Nasiff | |
| 4,758,165 A | 7/1988 | Tieman et al. | |
| 4,771,344 A | 9/1988 | Fallacaro et al. | |
| 4,772,205 A | 9/1988 | Chlumsky et al. | |
| 4,791,416 A | 12/1988 | Adler | |
| 4,811,921 A | 3/1989 | Whitaker et al. | |
| 4,821,030 A | 4/1989 | Batson et al. | |
| 4,871,992 A | 10/1989 | Petersen | |
| 4,885,565 A | 12/1989 | Embach | |
| 4,891,764 A | 1/1990 | McIntosh | |
| 4,897,582 A | 1/1990 | Otten et al. | |
| 4,926,879 A | 5/1990 | Sevrain et al. | |
| 4,933,584 A | 6/1990 | Harms et al. | |
| 4,986,280 A | 1/1991 | Marcus et al. | |
| 5,022,384 A | 6/1991 | Freels et al. | |
| 5,035,242 A | 7/1991 | Franklin et al. | |
| 5,121,091 A | 6/1992 | Fujiyama | |
| 5,143,505 A | 9/1992 | Burdea et al. | |
| RE34,095 E | 10/1992 | Padula et al. | |
| 5,159,159 A | 10/1992 | Asher | |
| 5,165,897 A | 11/1992 | Johnson | |
| 5,172,092 A | 12/1992 | Nguyen et al. | |
| 5,175,459 A | 12/1992 | Danial et al. | |
| 5,184,310 A | 2/1993 | Takenouchi | |
| 5,186,629 A | 2/1993 | Rohen | |
| 5,194,786 A | 3/1993 | Smith et al. | |
| 5,212,473 A | 5/1993 | Louis | |
| 5,223,658 A | 6/1993 | Suzuki | |
| 5,237,327 A | 8/1993 | Saitoh et al. | |
| 5,245,245 A | 9/1993 | Goldenberg | |
| 5,262,777 A | 11/1993 | Low et al. | |
| 5,316,017 A | 5/1994 | Edwards et al. | |
| 5,321,762 A * | 6/1994 | Stuart | 381/420 |
| 5,327,790 A | 7/1994 | Levin et al. | |
| 5,334,893 A | 8/1994 | Oudet et al. | |
| 5,355,148 A | 10/1994 | Anderson | |
| 5,376,948 A | 12/1994 | Roberts | |
| 5,389,849 A | 2/1995 | Asano et al. | |
| 5,434,549 A | 7/1995 | Hirabayashi et al. | |
| 5,437,607 A | 8/1995 | Taylor | |
| 5,437,608 A | 8/1995 | Cutler | |
| 5,440,183 A | 8/1995 | Denne | |
| 5,451,924 A | 9/1995 | Massimino et al. | |
| 5,456,341 A | 10/1995 | Garnjost et al. | |
| 5,489,812 A | 2/1996 | Furuhata et al. | |
| 5,492,312 A | 2/1996 | Carlson | |
| 5,521,336 A | 5/1996 | Buchanan et al. | |
| 5,554,900 A | 9/1996 | Pop, Sr. | |
| 5,555,894 A | 9/1996 | Doyama et al. | |
| 5,562,707 A | 10/1996 | Prochazka et al. | |
| 5,580,251 A | 12/1996 | Gilkes et al. | |
| 5,625,575 A | 4/1997 | Goyal et al. | |
| 5,629,594 A | 5/1997 | Jacobus et al. | |
| 5,638,060 A | 6/1997 | Kataoka et al. | |
| 5,649,020 A | 7/1997 | McClurg et al. | |
| 5,650,704 A | 7/1997 | Pratt et al. | |
| 5,661,446 A | 8/1997 | Anderson et al. | |
| 5,668,423 A | 9/1997 | You et al. | |
| 5,669,818 A | 9/1997 | Thorner et al. | |
| 5,670,755 A | 9/1997 | Kwon | |
| 5,691,898 A | 11/1997 | Rosenberg et al. | |
| 5,709,219 A | 1/1998 | Chen et al. | |
| 5,719,561 A | 2/1998 | Gonzales | |
| 5,729,249 A | 3/1998 | Yasutake | |
| 5,731,804 A | 3/1998 | Rosenberg | |
| 5,734,236 A | 3/1998 | Motegi | |
| 5,734,373 A * | 3/1998 | Rosenberg et al. | 345/161 |
| 5,742,278 A | 4/1998 | Chen et al. | |
| 5,749,533 A | 5/1998 | Daniels | |
| 5,767,457 A | 6/1998 | Gerpheide et al. | |
| 5,767,839 A | 6/1998 | Rosenberg | |
| 5,793,598 A | 8/1998 | Watanabe et al. | |
| 5,808,381 A | 9/1998 | Aoyama et al. | |
| 5,825,308 A | 10/1998 | Rosenberg | |
| 5,828,197 A | 10/1998 | Martin et al. | |
| 5,835,080 A | 11/1998 | Beeteson et al. | |
| 5,841,423 A | 11/1998 | Carroll, Jr. et al. | |
| 5,857,986 A | 1/1999 | Moriyasu | |
| 5,861,699 A | 1/1999 | Kopac | |
| 5,887,995 A | 3/1999 | Holehan | |
| 5,889,236 A | 3/1999 | Gillespie et al. | |
| 5,894,263 A | 4/1999 | Shimakawa et al. | |
| 5,896,076 A | 4/1999 | van Namen | |
| 5,917,906 A | 6/1999 | Thornton | |
| 5,942,733 A | 8/1999 | Allen et al. | |
| 5,943,044 A | 8/1999 | Martinelli et al. | |
| 5,945,772 A | 8/1999 | Macnak et al. | |
| 5,952,806 A | 9/1999 | Muramatsu | |
| 5,959,613 A * | 9/1999 | Rosenberg et al. | 345/161 |
| 5,973,678 A | 10/1999 | Stewart et al. | |
| 5,977,867 A | 11/1999 | Blouin | |
| 5,982,304 A | 11/1999 | Selker et al. | |
| 5,986,643 A | 11/1999 | Harvill et al. | |
| 5,988,902 A | 11/1999 | Holehan | |
| 6,001,014 A | 12/1999 | Ogata et al. | |
| 6,002,184 A | 12/1999 | Delson et al. | |
| 6,008,800 A | 12/1999 | Pryor | |
| 6,020,875 A | 2/2000 | Moore et al. | |
| 6,020,876 A | 2/2000 | Rosenberg et al. | |
| 6,036,495 A | 3/2000 | Marcus et al. | |
| 6,037,927 A | 3/2000 | Rosenberg | |
| 6,044,646 A | 4/2000 | Silverbrook | |
| 6,046,726 A | 4/2000 | Keyson | |
| 6,057,753 A | 5/2000 | Myers | |
| 6,067,081 A | 5/2000 | Hahlganss et al. | |
| 6,067,871 A | 5/2000 | Markyvech et al. | |
| 6,072,475 A | 6/2000 | van Ketwich et al. | |
| 6,078,126 A | 6/2000 | Rollins et al. | |
| 6,088,017 A | 7/2000 | Tremblay et al. | |
| 6,088,019 A | 7/2000 | Rosenberg | |
| 6,088,020 A | 7/2000 | Mor | |
| 6,111,577 A | 8/2000 | Zilles et al. | |
| 6,118,435 A | 9/2000 | Fujita et al. | |
| 6,128,006 A | 10/2000 | Rosenberg et al. | |
| 6,140,987 A | 10/2000 | Stein et al. | |
| 6,149,490 A | 11/2000 | Hampton et al. | |
| 6,161,126 A | 12/2000 | Wies et al. | |
| 6,171,191 B1 | 1/2001 | Ogata et al. | |
| 6,184,868 B1 | 2/2001 | Shahoian et al. | |
| 6,198,206 B1 | 3/2001 | Saarmaa et al. | |
| 6,216,059 B1 | 4/2001 | Ierymenko | |
| 6,219,032 B1 | 4/2001 | Rosenberg et al. | |
| 6,219,034 B1 | 4/2001 | Elbing et al. | |
| 6,239,790 B1 | 5/2001 | Martinelli et al. | |
| 6,243,080 B1 | 6/2001 | Molne | |
| 6,246,390 B1 | 6/2001 | Rosenberg | |
| 6,252,579 B1 | 6/2001 | Rosenberg et al. | |
| 6,252,583 B1 | 6/2001 | Braun et al. | |
| 6,256,011 B1 | 7/2001 | Culver | |
| 6,262,717 B1 | 7/2001 | Donohue et al. | |
| 6,268,671 B1 | 7/2001 | Furuki | |
| 6,283,859 B1 | 9/2001 | Carlson et al. | |
| 6,300,936 B1 | 10/2001 | Braun et al. | |
| 6,300,938 B1 | 10/2001 | Culver | |
| 6,310,604 B1 | 10/2001 | Furusho et al. | |
| 6,323,449 B1 | 11/2001 | Janniere | |
| 6,324,928 B1 | 12/2001 | Hughes | |
| 6,326,901 B1 | 12/2001 | Gonzales | |
| 6,337,678 B1 * | 1/2002 | Fish | 345/156 |
| 6,373,465 B2 | 4/2002 | Jolly et al. | |
| 6,388,655 B1 | 5/2002 | Leung | |
| 6,394,239 B1 | 5/2002 | Carlson | |
| 6,404,107 B1 | 6/2002 | Lazarus et al. | |
| 6,414,674 B1 | 7/2002 | Kamper et al. | |
| 6,415,138 B2 | 7/2002 | Sirola et al. | |
| 6,420,806 B2 | 7/2002 | Wittig | |
| 6,424,356 B2 | 7/2002 | Chang et al. | |

| | | | | | | |
|---|---|---|---|---|---|---|
| 6,429,846 | B2* | 8/2002 | Rosenberg et al. ............ 345/156 | JP | 7-64723 | 3/1995 |
| 6,437,770 | B1 | 8/2002 | Venema et al. | JP | 07-113703 | 5/1995 |
| 6,445,284 | B1 | 9/2002 | Cruz-Hernandez et al. | JP | 07-266263 | 10/1995 |
| 6,448,977 | B1 | 9/2002 | Braun et al. | JP | 2511577 | 7/1996 |
| 6,456,024 | B1 | 9/2002 | Schmider et al. | JP | 10293644 A | 11/1998 |
| 6,469,695 | B1 | 10/2002 | White | JP | 11-299305 | 2/1999 |
| 6,473,069 | B1 | 10/2002 | Gerpheide | JP | 11-85400 | 3/1999 |
| 6,485,113 | B2 | 11/2002 | Riley et al. | JP | 11-338629 | 12/1999 |
| 6,487,421 | B2 | 11/2002 | Hess et al. | JP | 2000339550 A | 12/2000 |
| 6,496,200 | B1 | 12/2002 | Snibbe et al. | JP | 2001-350592 | 12/2001 |
| 6,501,203 | B2 | 12/2002 | Tryggvason | JP | 2002-157087 | 5/2002 |
| 6,509,892 | B1 | 1/2003 | Kamper et al. | JP | 2002-236543 | 8/2002 |
| 6,518,958 | B1 | 2/2003 | Miyajima et al. | JP | 2002-259059 | 9/2002 |
| 6,529,122 | B1 | 3/2003 | Magnussen et al. | WO | WO 92/00559 A1 | 1/1992 |
| 6,531,998 | B1 | 3/2003 | Gordon | WO | WO 95/20788 A1 | 8/1995 |
| 6,535,201 | B1 | 3/2003 | Cooper et al. | WO | WO 97/18546 | 5/1997 |
| 6,587,091 | B2 | 7/2003 | Serpa | WO | WO 97/31333 | 8/1997 |
| 6,610,936 | B2 | 8/2003 | Gillespie et al. | WO | WO 99/40504 A1 | 8/1999 |
| 6,628,195 | B1 | 9/2003 | Coudon | WO | WO 00/41788 | 7/2000 |
| 6,636,197 | B1 | 10/2003 | Goldenberg et al. | WO | WO 02/12991 A1 | 2/2002 |
| 6,636,202 | B2 | 10/2003 | Ishmael, Jr. et al. | WO | WO 02/27645 A1 | 4/2002 |
| 6,639,581 | B1 | 10/2003 | Moore et al. | WO | WO 02/31807 A1 | 4/2002 |
| 6,639,582 | B1 | 10/2003 | Shrader | | | |
| 6,647,145 | B1 | 11/2003 | Gay | | | |
| 6,654,003 | B2 | 11/2003 | Boldy | | | |
| 6,664,664 | B2 | 12/2003 | Botos et al. | | | |
| 6,686,901 | B2 | 2/2004 | Rosenberg | | | |
| 6,697,043 | B1 | 2/2004 | Shahoian | | | |
| 6,697,748 | B1 | 2/2004 | Rosenberg et al. | | | |
| 6,710,518 | B2 | 3/2004 | Morton et al. | | | |
| 6,710,764 | B1 | 3/2004 | Burgel et al. | | | |
| 6,822,635 | B2 | 11/2004 | Shahoian et al. | | | |
| 6,834,373 | B2 | 12/2004 | Dieberger | | | |
| 6,850,150 | B1 | 2/2005 | Ronkainen | | | |
| 6,854,573 | B2 | 2/2005 | Jolly et al. | | | |
| 6,859,819 | B1 | 2/2005 | Rosenberg et al. | | | |
| 6,876,891 | B1 | 4/2005 | Schuler et al. | | | |
| 6,965,370 | B2 | 11/2005 | Gregorio et al. | | | |
| 6,985,133 | B1 | 1/2006 | Rodomista et al. | | | |
| 7,009,595 | B2 | 3/2006 | Roberts et al. | | | |
| 7,056,123 | B2 | 6/2006 | Gregorio et al. | | | |
| 7,061,467 | B2 | 6/2006 | Rosenberg | | | |
| 7,113,177 | B2 | 9/2006 | Franzen | | | |
| 7,151,528 | B2 | 12/2006 | Taylor et al. | | | |
| 7,161,580 | B2 | 1/2007 | Bailey et al. | | | |
| 7,175,642 | B2 | 2/2007 | Briggs et al. | | | |
| 7,292,227 | B2* | 11/2007 | Fukumoto et al. ............ 345/173 | | | |
| 2002/0030663 | A1 | 3/2002 | Tierling et al. | | | |
| 2002/0075135 | A1* | 6/2002 | Bown ...................... 340/384.1 | | | |
| 2002/0149561 | A1 | 10/2002 | Fukumoto et al. | | | |
| 2002/0149570 | A1 | 10/2002 | Knowles et al. | | | |
| 2002/0159336 | A1 | 10/2002 | Brown et al. | | | |
| 2002/0177471 | A1 | 11/2002 | Kaaresoja et al. | | | |
| 2002/0185919 | A1 | 12/2002 | Botos et al. | | | |
| 2003/0006892 | A1 | 1/2003 | Church | | | |
| 2003/0016211 | A1 | 1/2003 | Woolley | | | |
| 2003/0030628 | A1 | 2/2003 | Sato et al. | | | |
| 2003/0058265 | A1 | 3/2003 | Robinson et al. | | | |
| 2003/0067449 | A1 | 4/2003 | Yoshikawa et al. | | | |
| 2003/0071795 | A1 | 4/2003 | Baldauf et al. | | | |
| 2003/0076298 | A1 | 4/2003 | Rosenberg | | | |
| 2003/0122779 | A1* | 7/2003 | Martin et al. ................. 345/156 | | | |
| 2003/0128191 | A1 | 7/2003 | Strasser et al. | | | |
| 2004/0075676 | A1 | 4/2004 | Rosenberg et al. | | | |
| 2004/0100490 | A1* | 5/2004 | Boston et al. ................. 345/744 | | | |
| 2005/0007342 | A1 | 1/2005 | Cruz-Hernandez et al. | | | |
| 2006/0109256 | A1 | 5/2006 | Grant et al. | | | |

FOREIGN PATENT DOCUMENTS

| | | |
|---|---|---|
| EP | 0556999 | 8/1993 |
| EP | 0607580 | 7/1994 |
| EP | 0 556 999 B1 | 5/1998 |
| EP | 0970714 A2 | 1/2000 |
| FR | 2851347 | 8/2004 |
| GB | 2347199 | 8/2000 |
| JP | 63-164127 | 10/1988 |
| JP | 5-20226 | 3/1993 |
| JP | 6-018341 | 1/1994 |
| JP | 6-139018 | 5/1994 |

OTHER PUBLICATIONS

International Search Report for International Application No. PCT/US2005/036861, date of mailing Feb. 23, 2006.

Japanese Notice of Rejection in Japanese Application No. 2007-535920, dated Aug. 3, 2010.

Japanese Notice of Rejection (Final) in Japanese Application No. 2007-535920, dated Jan. 25, 2011.

Adelstein, Bernard Dov, "A Virtual Environment System for the Study of Human Arm Tremor," Dept. of Mechanical Engineering, MIT 1989, pp. 2-252.

Adelstein, Bernard D. et al., "A High Performance Two Degree-Of-Freedom Kinesthetic Interface", In Human Machine Interfaces for Teleoperators and Virtual Environments, NASA Conference Publication 10071, pp. 108-113, 1991.

Bergamasco, Massimo, "Haptic Interfaces: The Study of Force and Tactile Feedback Systems," IEEE International Workshop on Robot and Human Communication, 1995, pp. 15-20.

Burdea et al., "Distributed Virtual Force Feedback," IEEE, May 2, 1993, pp. 25-44.

Buttolo, P., "Hard Disk Actuators for Mini Teleoperation," Telemanipulator and Telepresence Technologies Symposium, 1994, pp. 55-61.

Carreras, R. "Introducing a Revolutionary Moving Magnet Linear Motor," www.enduratec.com, retrieved Nov. 2005, 5 pages.

Durlach, Nathaniel I. et al., "Virtual Reality: Scientific and Technological Challenges," National Academy Press, Washington, D.C. 1995, pp. 160-205.

ESA (European Space Agency), "Automation and Robotics", Sep. 15, 2000, pp. 21-23.

Fricke et al., "Design of a tactile graphic I/O tablet and its integration into a personal computer system for blind users," Journal of Microcomputer Applications, vol. 16, Issue 3, Jul. 1993, pp. 259-269.

Greenleaf, W. et al., "Augmenting Reality in Rehabilitation Medicine," Virtual Reality Special Report, vol. 2(1), 1995, 9-14.

Jackson, K. M., "Linearity of Radio-Frequency Transducers," Medical and Biological Engineering and Computer, Jul. 1977, pp. 446-449.

Minsky, M., "Computational Haptics: The Sandpaper System for Synthesizing Texture for a Force-Feedback Display," Ph.D. Dissertation, Massachusetts Institute of Technology, Cambridge, MA, Jun. 1995, 217 pages.

Rosenberg, Louis B. et al, "Perceptual Decomposition of Virtual Haptic Surfaces," Proceedings of the IEEE 1993 Symposium on Research Frontiers in Virtual Reality, 1993, pp. 46-53.

Rosenberg, L., et al, "Commercially Viable Force Feedback Controller for Individuals with Neuromotor Disabilities," Crew Systems Directorate, Biodynamics and Biocommunications Division, Wright Patterson AFB, OH, May 1996, pp. 1-33.

Rosenberg, Louis B., "Virtual Fixtures": Perceptual Overlays Enhance Operator Performance in Telepresence Tasks, Dept. of Mechanical Engineering, Stanford University, Aug. 1994, pp. ii-214.

Russo, Massimo Andrea, "The Design and Implementation of a Three Degree of Freedom Force Output Joystick," Dept. of Mechanical Engineering, MIT May 1990, 131 pages.

Russo, M., et al., "Controlling Dissipative Magnetic Particle Brakes in Force Reflective Devices," DSC-vol. 42, Advances in Robotics, ASME 1992, pp. 63-70, (1992).

Saito, K. et al., "A Microprocessor-Controlled Speed Regulator with Instantaneous Speed Estimation for Motor Drives," Proceedings of the IEEE Transactions on Industrial Electronics, vol. 35, No. 1, Feb. 1988, pp. 95-99.

Shahinpoor, M., "A New Effect in Ionic Polymeric Gels : The Ionic Flexogelectric Effect," Proceedings SPIE 1995 North American Conference on Smart Structures and Materials, Feb. 28-Mar. 2, 1995, San Diego, CA, vol. 2441, No. 05, 1995, pp. 42-53.

Snibbe, S. et al. "Haptic Techniques for Media Control," Proceedings of the 14th Annual ACM Symposium on User Interface Software and Technology (UIST 2001), ACM Press, Nov. 2001, 10 pages.

Snow et al., "Model-X Force-Reflecting-Hand-Controller", NT Control No. NPO-17851; JPL Case No. 7348, 1989, pp. 1-4 with 25 pages of attachments.

Tadros, A. H., "Control System Design for a Three Degree of Freedom Virtual Environment Simulator Using Motor/Brake Pair Actuators," Dept. of Mechanical Engineering, MIT Feb. 1990, pp. 2-88.

Voyles, R., et al., "Design of a Modular Tactile Sensor and Actuator Based on an Electrorheological Gel," in: Proceedings of the 1996 IEEE International Conference on Robotics and Automation, Minneapolis, MN, Apr. 1996, pp. 13-17.

Yamakita, M. et al., "Tele Virtual Reality of Dynamic Mechanical Model," Proceedings of the 1992 IEEE/RSJ International Conference on Intelligent Robots and Systems, Jul. 7-10, 1992, pp. 1103-1110.

Office Action in U.S. Appl. No. 11/249,021, mailed Jan. 13, 2011.
Office Action in U.S. Appl. No. 11/249,021, mailed Feb. 19, 2009.
Office Action in U.S. Appl. No. 11/249,021, mailed Aug. 2, 2011.
Office Action in U.S. Appl. No. 11/249,021, mailed Aug. 16, 2010.
Office Action in U.S. Appl. No. 11/249,021, mailed Oct. 15, 2009.

Bliss, James C., "Optical-to-Tactile Image Conversion for the Blind," IEEE Transactions on Man-Machine Systems, vol. MMS-11, No. 1, 1970, pp. 58-65.

Bolanowski, S.J. et al., "Four Channels Mediate the Mechanical Aspects of Touch," J. Acoust. Soc. Am. 84 vol. 84 (5), Nov. 1988, pp. 1680-1694.

Eberhardt, Silvio P. et al., "OMAR—A Haptic Display for Speech Perception by Deaf and Deaf-Blind Individuals," IEEE 1993, pp. 195-201.

Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Fukumoto, Masaaki et al., "Active Click: Tactile Feedback for Touch Panels," NTT DoCoMo Multimedia Labs, Apr. 2001, pp. 121-122.

Goldstein, Moise H. et al., "Tactile Aids for the Profoundly Deaf Child," 77 J. Acoust. Soc. Am 77 (1), Jan. 1985, pp. 258-265.

Johnson, David A., "Shape-Memory Alloy Tactical Feedback Actuator," Tini Allow Company, Inc., Aug. 1990, 2 pages, pp. i-33.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kaczmarek, K. A. et al. "Tactile Displays," in: Virtual Environments and Advanced Interface Design, New York: Oxford University Press, 1995, pp. 349-414.

Peine, W.J., "Tactile Shape Displays for Small Scale Shape Feedback," http://www.hrl.harvard.edu/~peine/display.html, 1998, pp. 1-2.

Poupyrev, Ivan et al, "Tactile interfaces for Small Touch Screens," AMC 2003, vol. 5, Issue 2, 2003, pp. 217-220.

Rabinowitz, W. M. et al., "Multidimensional Tactile Displays: Identification of Vibratory Intensity, Frequency, and Contactor Area," J. Acoust. Soc. Am. 82 (4), Oct. 1987, pp. 1243-1252.

Ramstein, Christophe, "Combining Haptic and Braille Technologies: Design Issues and Pilot Study," Assets '96, 2nd Annual ACM Conference on Assistive Technologies, ACM SIGRAPH, Apr. 1996, pp. 37-44.

SMK "Force Feedback Type Optical Touch Panel Developed," SMK Corporation, No. 631csc, http://www.smk.co.jp/whatsnew_e/631csc_e.html, Oct. 30, 2002, pp. 1-2.

SMK, "Multi-Functional Touch Panel, Force-Feedback Type, Developed," SMK Corporation, No. 628csc, http://www.smk.co.jp.whatsnew_e/628csc_e.html, Sep. 30, 2002, pp. 1-2.

Taylor, Mike, "Field-Effect Sensor Offers Sealed, Long Life Operation," Useful Technology for Your Idea File, Mar. 15, 2004, www.designnews.com, 1 page.

Wiker, Steven F., "Teletouch Display Development: Phase 1 Report," Naval Ocean Systems Center, Technical Report 1230, Jul. 1988, 66 pages.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

\* cited by examiner

Press Down                Release

Press Down                Release

HAPTIC FEEDBACK FOR BUTTON AND SCROLLING ACTION SIMULATION IN TOUCH INPUT DEVICES

CROSS REFERENCE TO RELATED APPLICATIONS

This application claims the benefit of U.S. Provisional Patent Application Ser. No. 60/616,648 filed Oct. 8, 2004 in the name of the same inventors and commonly assigned herewith.

This application may be considered to be related to the following prior patents and patent applications: U.S. patent application Ser. No. 10/615,986, filed Jul. 10, 2003, which is, in turn, a continuation of U.S. patent application Ser. No. 10/213,940, filed Aug. 6, 2002, which is, in turn, a continuation of U.S. patent application Ser. No. 09/487,737, filed Jan. 19, 2000, now U.S. Pat. No. 6,429,846, which is, in turn, a continuation-in-part of U.S. patent application Ser. No. 09/467,309, filed Dec. 17, 1999, now U.S. Pat. No. 6,563,487, which is, in turn, a continuation-in-part of U.S. patent application Ser. No. 09/156,802, filed Sep. 17, 1998, now U.S. Pat. No. 6,184,868, which is, in turn, a continuation-in-part of U.S. patent application Ser. No. 09/103,281, filed Jun. 23, 1998, now U.S. Pat. No. 6,088,019, which is, in turn, a continuation-in-part of U.S. patent application Ser. No. 09/253,132, filed Feb. 18, 1999, now U.S. Pat. No. 6,243,078, all commonly assigned herewith. This application may also be considered to be related to U.S. patent application Ser. No. 09/917,263, filed Jul. 26, 2001, now U.S. Pat. No. 6,822,635 (based on U.S. Provisional Patent Application Ser. No. 60/274,444, filed Mar. 9, 2001); U.S. patent application Ser. No. 10/213,354, filed Aug. 5, 2002, now abandoned; U.S. patent application Ser. No. 10/919,648, filed Aug. 17, 2004, now pending; U.S. patent application Ser. No. 10/919,798, filed Aug. 17, 2004, now pending; PCT/US01/01486, filed Jan. 17, 2001; and PCT/US02/17102, filed Mar. 8, 2002. All of the foregoing U.S. patents and applications are hereby incorporated herein by reference as if set forth fully herein.

BACKGROUND OF THE INVENTION

The present invention relates generally to the interfacing with computer and mechanical devices by a user, and more particularly to devices used to interface with computer systems and electronic devices and which provide haptic feedback to the user.

Humans interface with electronic and mechanical devices in a variety of applications, and the need for a more natural, easy-to-use, and informative interface is a constant concern. In the context of the present invention, humans interface with computer devices for a variety of applications. One such application is interacting with computer-generated environments such as are found in, for example, games, simulations, and application programs.

In some interface devices, force feedback or tactile feedback is also provided to the user, collectively known herein as "haptic feedback." For example, haptic versions of joysticks, mice, game pads, steering wheels, or other types of devices can output forces to the user based on events or interactions occurring within the computer-generated environment, such as a graphical environment found in a game, simulation or other application program.

In portable computer or electronic devices, such as laptop computers, moveable mouse-type position encoding input device often require too large a workspace to be practical. As a result, more compact devices such as trackballs are often used. A more popular device for portable computers are "touchpads," which are usually embodied as small rectangular, planar pads provided near the keyboard of the computer. Touchscreens are also used and becoming more popular. Touchpads do not incorporate an integral display device— touchscreens do. Such touch input devices sense the location of a pointing object (such as a user's finger or an input stylus) by any of a variety of sensing technologies, such as capacitive sensors, infrared light beams, pressure sensors that detect pressure applied to the touch input device, and the like. In a common application the user contacts the touch input device with a fingertip and moves his or her finger on the surface of the control to move a cursor displayed in the graphical environment or to select a displayed element. In other applications, a stylus may be used instead of a finger.

One problem with existing touch input devices is that there is no haptic feedback provided to the user. The user of a touchpad is therefore not able to experience haptic sensations that assist and inform the user of targeting and other control tasks within the graphical environment. The touch input devices of the prior art also cannot take advantage of existing haptic-enabled software run on the portable computer.

SUMMARY OF THE INVENTION

The present invention is directed to a haptic feedback planar touch input device used to provide input to a computer system. The touch input device can be a touchpad provided on a portable computer, or it can be a touch screen found on a variety of devices, or it may be implemented with similar input devices. The haptic sensations output on the touch input device enhance interactions and manipulations in a displayed graphical environment or when using the touch input device to control an electronic device.

More specifically, the present invention relates to a haptic feedback touch input device for inputting signals to a computer and for outputting forces to a user of the touch input device. The touch input device includes an approximately planar (planar or near-planar) touch surface operative to input a position signal to a processor of said computer based on a location of user contact on the touch surface. The position signal may be used in a number of ways, for example, it may be used to position a cursor in a graphical environment displayed on a display device based at least in part on the position signal. It may be used to rotate, reposition, enlarge and/or shrink an image of an object displayed on a display device based at least in part on the position signal. It may be used to provide other desired inputs to a computing device. These inputs may include scroll-inputs causing text or displayed images to move up, down, right or left, to rotate, or to be made larger or smaller in the graphical environment. At least one actuator is also coupled to the touch input device and outputs a force on the touch input device to provide a haptic sensation to the user contacting the touch surface. The actuator outputs the force based on force information output by the processor to the actuator. Most touch input devices also will include an ability to measure the relative pressure applied to the touch input device while touching it and that relative pressure may also be used for control and may be used at least in part to create haptic output to the user.

The touch input device can be a touchpad separate from a display screen of the computer, or can be included in a display screen of the computer as a touch screen. The touch input device can be integrated in a housing of the computer or handheld device, or provided in a housing that is separate from the computer. The user contacts the touch surface with a finger, a stylus, or other object. The actuator can include a piezo-electric actuator, a voice coil actuator, a pager motor, a solenoid, or other type of actuator. In one embodiment, the actuator is coupled between the touch input device and a grounded surface. In another embodiment, the actuator is coupled to an inertial mass. The actuator may be coupled to cause relative movement between a display screen and a transparent touch input panel disposed over the display screen in a touch screen device. A touch device microprocessor which may be separate from the main processor of the computer can receive force information from the host computer and provide control signals based on the force information to control the actuator.

The haptic sensations, such as a pulse, vibration, or spatial texture, may be output in accordance with an interaction between a user controlled location and a graphical object in the graphical environment. The touch input device can include multiple different regions, where at least one of the regions provides the position signal and at least one other region provides a signal that is used by the computer to control a different function, such as rate control function of a value or a button press. Different regions and borders between regions can be associated with different haptic sensations. Alternatively, rate control may be established through a magnitude of the touch force applied by the user. For example, more force could be used to increase the rate input and less force could be used to decrease it.

The present invention advantageously provides haptic feedback to a planar touch control device of a computer, such as a touchpad or touch screen. The haptic feedback can assist and inform the user of interactions and events within a graphical user interface or other environment and ease cursor targeting tasks. Furthermore, the invention allows portable computer devices having such touch controls to take advantage of existing haptic feedback enabled software. The haptic touch devices disclosed herein may also be produced so that they are inexpensive, compact and consume low power, allowing them to be easily incorporated into a wide variety of portable and desktop computers and electronic devices.

These and other advantages of the present invention will become apparent to those skilled in the art upon a reading of the following specification of the invention and a study of the several figures of the drawing.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF PREFERRED EMBODIMENTS

Embodiments of the present invention are described herein in the context of a system of touch input devices with haptic feedback. Sometimes these are referred to herein as touch control devices. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
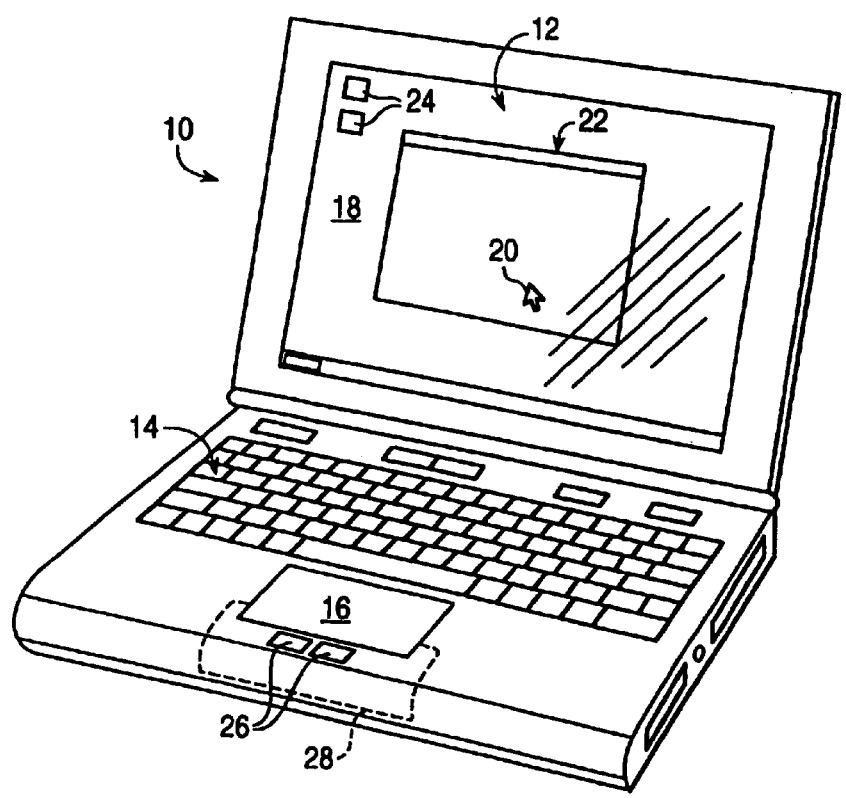
FIG. 1 is a perspective view of a haptic touchpad of the present invention.

FIG. 1 is a perspective view of a portable computer 10 including a haptic touchpad of the present invention. Computer 10 is preferably a portable or "laptop" computer that can be carried or otherwise transported by the user and may be powered by batteries or other portable energy source in addition to other more stationary power sources. Computer 10 preferably runs one or more host application programs with which a user is interacting via peripherals. Some display devices 12 for computers are display-only devices—in other cases the display devices incorporate a touch-sensitive surface and may themselves be used for touch input. Such screens are frequently seen in kiosks, automatic teller machines, automated vending machines of various types, and the like.

Computer 10 may include the various input and output devices as shown, including a display device 12 for outputting graphical images to the user, a keyboard 14 for providing character or toggle input from the user to the computer, and a touchpad 16 of the present invention. Display device 12 can be any of a variety of types of display devices; flat-panel displays are most common on portable computers. Display device 12 can display a graphical environment 18 based on application programs and/or operating systems that are running, such as a graphical user interface (GUI), that can include a cursor 20 that can be moved by user input, as well as windows 22, icons 24, and other graphical objects well known in GUI environments. Other devices may also be incorporated or coupled to the computer 10, such as storage devices (hard disk drive, DVD-ROM drive, and the like), network server or clients, game controllers, and the like. In alternate embodiments, the computer 10 can take a wide variety of forms, including computing devices that rest on a tabletop or other surface, stand-up arcade game machines, automatic teller machines (ATMs), automatic vending machines, other portable devices or devices worn on the person, handheld or used with a single hand of the user, and the like. For example, host computer 10 can be a video game console, personal computer, workstation, a television "set top box" or a "network computer", or other computing or electronic device.

Touchpad device 16 of the present invention preferably appears externally to be similar to the touchpads of the prior art. Pad 16 includes a planar, rectangular smooth surface that can be positioned below the keyboard 14 on the housing of the computer 10, as shown, or may be positioned at other areas of the housing. When the user operates the computer 10, the user may conveniently place a fingertip or other object on the touchpad 16 and move the fingertip to correspondingly move cursor 20 in the graphical environment 18.

In operation, the touchpad 16 inputs coordinate data to the main microprocessor(s) of the computer 10 based on the sensed location of an object on (or near) the touchpad. As with many touchpads of the prior art, touchpad 16 can be capacitive, resistive, or use any appropriate type of sensing. Some existing touchpad embodiments are disclosed, for example, in U.S. Pat. Nos. 5,521,336 and 5,943,044. Capacitive touchpads typically sense the location of an object on or near the surface of the touchpad based on capacitive coupling between capacitors in the touchpad and the object. Resistive touchpads are typically pressure-sensitive, detecting the pressure of a finger, stylus, or other object against the pad, where the pressure causes conductive layers, traces, switches, and the like in the pad to electrically connect. Some resistive or other types of touchpads can detect the amount of pressure applied by the user and can use the degree of pressure for proportional or variable input to the computer 10. Resistive touchpads typically are at least partially deformable, so that when a pressure is applied to a particular location, the conductors at that location are brought into electrical contact. Such deformability can be useful in the present invention since it can potentially amplify the magnitude of output forces such as pulses or vibrations on the touchpad as used for haptic output in the present invention. Forces can be amplified if a tuned compliant suspension is provided between an actuator and the object that is moved, as described in U.S. Pat. No. 6,680,729, which is hereby incorporated herein by reference as if set forth fully herein. Capacitive touchpads and other types of touchpads that do not require significant contact pressure may be better suited for the present invention in many embodiments, since excessive pressure on the touchpad may in some cases interfere with the motion of the touchpad for haptic feedback. Other types of sensing technologies can also be used in the touchpad. Herein, the term "touchpad" preferably includes the surface of the touchpad 16 as well as any sensing apparatus (including software and/or firmware associated therewith) included in the touchpad unit.

Touchpad 16 preferably operates similarly to existing touchpads, where the speed of the fingertip on the touchpad correlates to the distance that a cursor (for example) is moved in the graphical environment. For example, if the user moves his or her finger quickly across the pad, the cursor is moved a greater distance than if the user moves the fingertip more slowly. If the user's finger reaches the edge of the touchpad before the cursor reaches a desired destination in that direction, then the user can simply move his or her finger off the touchpad, reposition the finger away from the edge, and continue moving the cursor. This is an "indexing" function similar to lifting a mouse off a surface to change the offset between mouse position and cursor. Furthermore, many touchpads can be provided with particular regions that are each assigned to particular functions that can be unrelated to cursor positioning. Such an embodiment is described in greater detail below with respect to FIG. 7. In some embodiments the touchpad 16 may also allow a user to "tap" the touchpad (rapidly touch and remove the object from the pad) in a particular location to provide a command. For example, the user can tap or "double tap" the pad with a finger while the controlled cursor is over an icon to select that icon.

In the present invention, the touch input device (touchpad 16 or touch screen) is provided with the ability to output haptic feedback such as tactile sensations to the user who is physically contacting the touch input device. Various embodiments detailing the structure of the haptic feedback touch input device are described in greater detail below. Preferably, the forces output on the touch input device are linear (or approximately linear (near-linear)) and oriented along the z-axis, perpendicular or approximately (near) perpendicular to the surface of the touch input device and a surface of computer 10. In a different embodiment, forces can be applied to the touch input device to cause side-to-side (e.g., x-y) motion of the touch input device in the plane of its surface in addition to or instead of z-axis motion, although such motion is not presently preferred.

Using one or more actuators coupled to the touch input device, a variety of haptic sensations can be output to the user who is contacting the touch input device. For example, jolts, vibrations (varying or constant amplitude), and textures can be output. Forces output on the touch input device can be at least in part based on the location of the finger on the touch input device or the state of a controlled object in the graphical environment of the host computer 10, and/or independent of finger position or object state. Such forces output on the touch input device are considered "computer-controlled" since a microprocessor or other electronic controller is controlling the magnitude and/or direction of the force output of the actuator(s) using electronic signals. Preferably, the entire touch input device is provided with haptic sensations as a single unitary member; in other embodiments, individually-moving portions of the pad can each be provided with its own haptic feedback actuator and related transmissions so that haptic sensations can be provided for only a particular portion. For example, some embodiments may include a touch input device having different portions that may be flexed or otherwise moved with respect to other portions of the touch input device.

In other embodiments, the touch input device can be provided in a separate housing that is electrically connected to a port of the computer 10 via wired or wireless means and which receives force information from and sends position information to the computer 10. For example, a number of well-known bus standards such as Universal Serial Bus (USB), Firewire (IEEE 1394), or a standard serial bus (RS-232) can connect such a touch input device to the computer 10. In such an embodiment, the computer 10 can be any desktop or stationary computer or device and need not be a portable device.

One or more buttons 26 can also be provided on the housing of the computer 10 to be used in conjunction with the touch input device. The user's hands have easy access to the buttons, each of which may be pressed by the user to provide a distinct input signal to the host computer 12. In some cases, each button 26 corresponds to a similar button found on a more conventional mouse input device, so that a left button can be used to select a graphical object (click or double click), a right button can bring up a context menu, and the like. In other cases a larger plurality of context-sensitive physical buttons may be provided about the periphery of the display with the current indicated function associated with a particular button displayed on the display. In some embodiments, one or more of the buttons 26 can be provided with tactile feedback as described in U.S. Pat. Nos. 6,184,868 and 6,563,487. Other features of these disclosures may also be used with the present invention.

Furthermore, in some embodiments, one or more moveable portions 28 of the housing of the computer device 10 can be included which is contacted by the user when the user operates the touchpad 16 and which portions 28 can provide haptic feedback to the user. Structures having a moveable portion of a housing for haptic feedback are described in U.S. Pat. Nos. 6,184,868 and 6,088,019. Thus, both the housing can provide haptic feedback (e.g., through the use of an eccentric rotating mass on a motor coupled to the housing) and the touchpad 16 can provide separate haptic feedback, and the touch screen assembly can provide haptic feedback. This allows the host to control multiple different tactile sensations simultaneously to the user; for example, a vibration of a low frequency can be conveyed through the housing to the user and a higher frequency vibration can be conveyed to the user through the touchpad 16. Each other button or other control provided with haptic feedback can also provide tactile feedback independently from the other controls, if desired.

The host application program(s) and/or operating system preferably displays graphical images of the environment on display device 12 (which may, in one embodiment, be a touch screen). The software and environment running on the host computer 12 may be of a wide variety. For example, the host application program can be a word processor, spreadsheet, video or computer game, drawing program, operating system, graphical user interface, simulation, Web page or browser that implements HTML or VRML instructions, scientific analysis program, virtual reality training program or application, JAVA applet or other application program that utilizes input from the touch input device and outputs force feedback commands to the touch input device. For example, many games and other application programs include force feedback functionality and may communicate with the touch input device using standard protocols and/or drivers such as I-Force®, FEELit®, or Touchsense™ available from Immersion Corporation of San Jose, Calif.

The touch input device can include circuitry necessary to report control signals to the microprocessor of the host computer 10 and to process command signals from the host's microprocessor. For example, appropriate sensors (and related circuitry) are used to report the position of the user's finger on the touchpad 16. The touchpad device also includes circuitry that receives signals from the host and outputs tactile sensations in accordance with the host signals using one or more actuators. In some embodiments, a separate, local microprocessor can be provided for the touchpad 16 to both report touchpad sensor data to the host and/or to carry out force commands received from the host, such commands including, for example, the type of haptic sensation and parameters describing the commanded haptic sensation. Alternatively, the touchpad microprocessor can simply pass streamed data from the main processor to the actuators. The term "force information" can include both commands/parameters and streamed data. The touchpad microprocessor can implement haptic sensations independently after receiving a host command by controlling the touchpad actuators; or, the host processor can maintain a greater degree of control over the haptic sensations by controlling the actuators more directly. In other embodiments, logic circuitry such as state machines provided for the touchpad 16 can handle haptic sensations as directed by the host main processor. Architectures and control methods that can be used for reading sensor signals and providing haptic feedback for a device are described in greater detail, for example, in U.S. Pat. Nos. 5,734,373; 6,639,581 and 6,411,276, all of which are hereby incorporated herein by reference as if set forth fully herein. Similarly, touchscreens may be used in much the same manner as touchpads.

Figure 2:
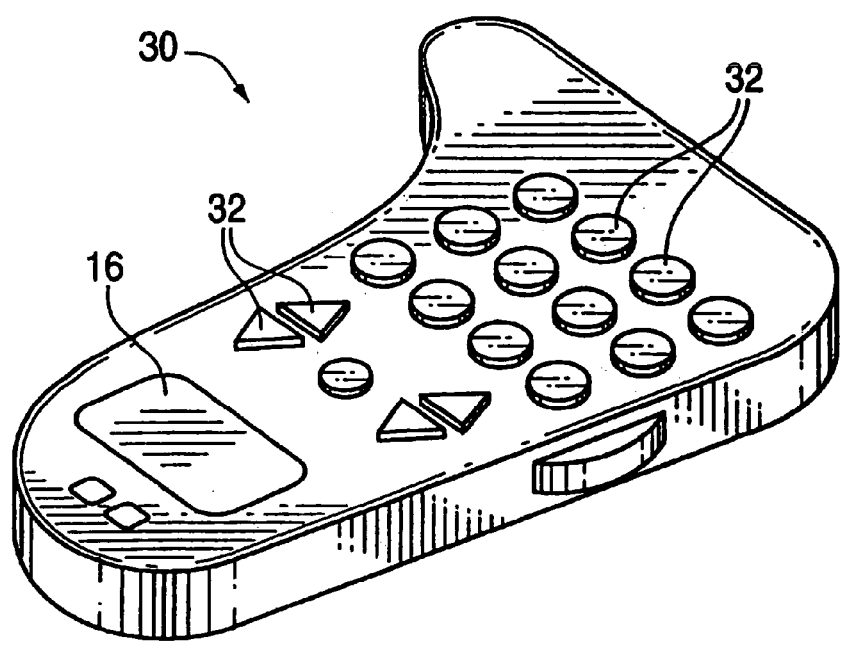
FIG. 2 is a perspective view of a remote control device including the touchpad of the present invention.

FIG. 2 is a perspective view of another embodiment of a device which can include an active touchpad 16 in accordance with the present invention. The device can be a handheld remote control device 30, which the user grasps in one hand and manipulates controls to access the functions of an electronic device or appliance remotely by a user (such as a television, video cassette recorder or DVD player, audio/video receiver, Internet or network computer connected to a television, and the like). For example, several buttons 32 can be included on the remote control device 30 to manipulate functions of the controlled apparatus. A touchpad 16 can also be provided to allow the user to provide more sophisticated directional input. For example, a controlled apparatus may have a selection screen in which a cursor or other object displayed thereon may be moved, and the touchpad 16 can be manipulated to control the display of the object. The touchpad 16 includes the ability to output haptic sensations to the user as described herein, based on a controlled value or event. For example, a volume level passing a mid-point or reaching a maximum level can cause a pulse to be output to the touchpad and to the user.

In one application, the controlled apparatus can be a computer system or other computing device which displays a graphical user interface and/or web pages accessed over a network such as the Internet. The user can control the direction of a cursor or other graphical object by moving a finger (or other object such as a stylus) on the touchpad 16. The cursor or other object can be used to select and/or manipulate icons, windows, menu items, graphical buttons, slider bars, scroll bars, or other graphical objects in a graphical user interface or desktop interface. The cursor or other object can also be used to select and/or manipulate graphical objects on a web page, such as links, images, buttons, and the like. Other force sensations associated with graphical objects are described below with reference to FIG. 7.

Figure 3:
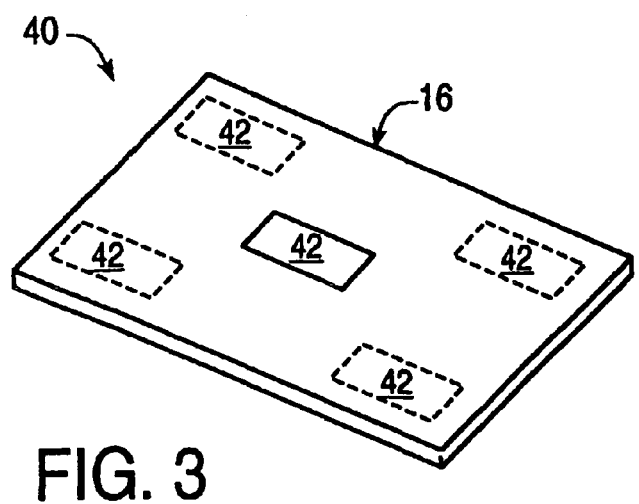
FIG. 3 is a perspective view of a first embodiment of the touchpad of the present invention including one or more actuators coupled to the underside of the touchpad.

FIG. 3 is a perspective view of a first embodiment 40 of a touchpad 16 of the present invention for providing haptic feedback to the user. In this embodiment, one or more piezoelectric actuators 42 are coupled to the underside of the touchpad 16. The piezoelectric actuator 42 is driven by suitable electronics, as is well known to those skilled in the art. In one embodiment, a single piezoelectric actuator 42 is positioned at or near the center of the touchpad 16, or off to one side if space constraints of the housing require such a position. In other embodiments, multiple piezoelectric actuators 42 can be positioned at different areas of the touchpad; the dashed lines show one configuration, where an actuator 42 is placed at each corner of the pad 16 and at the center of the pad.

The piezoelectric actuators 42 can each output a small pulse, vibration, or texture sensation on the touchpad 16 and to the user if the user is contacting the touchpad. The entire touchpad 16 is preferably moved with the forces output by actuator(s) 42. Preferably, the forces output on the touchpad are linear (or approximately linear) and along the z-axis, approximately perpendicular to the surface of the touchpad 16 and the top surface of computer 10. In a different embodiment, as mentioned above, forces can be applied to the touchpad 16 to cause side-to-side (e.g., x-y) motion of the pad in the plane of its surface in addition to or instead of z-axis motion. For example, one linear actuator can provide motion for the x-axis, and a second linear actuator can provide motion for the y-axis and/or the x-axis.

The frequency of a vibration output by an actuator 42 can be varied by providing different control signals to an actuator 42. Furthermore, the magnitude of a pulse or vibration can be controlled based on the applied control signal. If multiple actuators 42 are provided, a stronger vibration can be imparted on the touchpad by activating two or more actuators simultaneously. Furthermore, if an actuator is positioned at an extreme end of the touchpad and is the only actuator that is activated, the user may experience a stronger vibration on the side of the touchpad having the actuator than on the opposite side of the touchpad. Different magnitudes and localized effects can be obtained by activating some but not all of the actuators. Since the tip of a user's finger that is touching the pad is fairly sensitive, the output forces do not have to be of a high magnitude for the haptic sensation to be effective and compelling.

Besides using a finger to contact the touchpad, the user may also hold other objects that directly contact the touchpad. Any haptic sensations output on the pad can be transmitted through the held object to the user's hand. For example, the user can hold a stylus having a point that contacts the touchpad 16 more precisely than a finger. Other objects may also be used. In some embodiments, specialized objects can be used to enhance the haptic sensations. For example, a stylus or other object having a flexible portion or compliance may be able to magnify at least some of the touchpad haptic sensations as experienced by the user.

The piezo-electric actuators 42 have several advantages for the touchpad 16. These actuators can be made very thin and small, allowing their use in compact housings that are typical for portable electronic devices. They also require very low power, and are thus suitable for devices with limited power (e.g., powered by batteries). In some embodiments described herein, power for the actuators can be drawn off a bus connecting the computer to the touchpad (or touch screen). For example, if the touchpad 16 is provided in a separate housing, a Universal Serial Bus can connect the pad to the computer and provide power from the computer to the pad as well as data (e.g., streaming force data, force commands, and the like).

Figure 4:
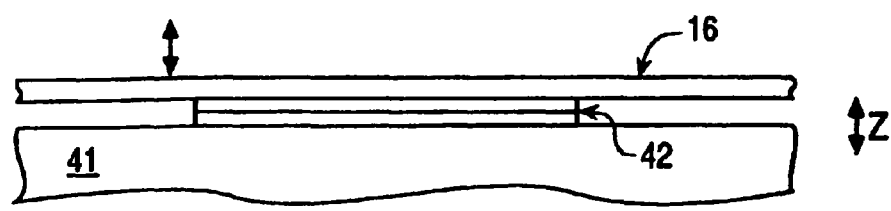
FIG. 4 is a side elevational view of a first embodiment of the present invention in which a piezo-electric actuator is directly coupled to the touchpad of the present invention.

FIG. 4 is a side elevational view of the embodiment 40 of the touchpad 16 of the present invention as shown in FIG. 3. Touchpad 16 is directly coupled to a grounded piezo-electric actuator 42 which operates to produce a force on the touchpad 16 when an electrical signal is input to the actuator. Typically, a piezo-electric actuator includes two layers which can move relative to each other when a current is applied to the actuator; here, the grounded portion of the actuator remains stationary with respect to the surrounding housing 41 while the moving portion of the actuator and the touchpad move with respect to the housing 41. The operation of piezo-electric actuators to output force based on an input electrical signal is well known to those skilled the art.

The touchpad 16 can be coupled only to the actuator 42, or can be additionally coupled to the housing of the computer device at other locations besides the actuators 42. Preferably the other couplings are compliant connections, using a material or element such as a spring or foam. If such connections are not made compliant, then the touchpad 16 itself preferably has some compliance to allow portions of the pad to move in response to actuator forces and to convey the haptic sensations to the user more effectively.

Since the touchpad 16 is directly coupled to the actuator 42, any produced forces are directly applied to the touchpad 16.

The electric signal preferably is obtained from a microprocessor and any circuitry required to convert the microprocessor signal to an appropriate signal for use with the actuator 42.

Figure 5:
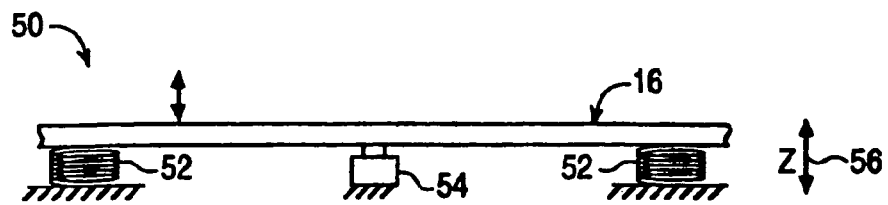
FIG. 5 is a side elevational view of a second embodiment of the touchpad of the present invention including a linear actuator.

FIG. 5 is a side elevational view of another embodiment 50 of the present invention, in which the touchpad 16 is positioned on one or more springs 52. The springs 52 couple the touchpad 16 to the rigid housing of the computer 10 and allow the touchpad 16 to be moved along the z-axis 56. Only a very small range of motion is required to produce effective pulses (jolts) or vibrations on the pad 16. Stops (not shown) can be positioned to limit the travel of the touchpad 16 to a desired range along the z-axis.

An actuator 54 is also coupled to the touchpad 16 to impart forces on the touchpad and cause the touchpad 16 to move along the z-axis. In the present embodiment, actuator 54 is a linear voice coil actuator, where the moving portion (bobbin) of the actuator is directly coupled to the touchpad 16. The actuator 54 is grounded to the computer 10 housing and outputs a linear force on the touchpad 16 and thus drives the touchpad along the z-axis. A short pulse or jolt can be output, or the moving portion of the actuator can be oscillated to provide a vibration having a particular desired frequency. The springs 52 cause the touchpad 16 to return to a rest position after a force from the actuator causes the touchpad to move up or down. The springs can also provide a compliant suspension for the touchpad 16 and allow forces output by the actuator 54 to be amplified as explained above. Different types of spring elements can be used in other embodiments to couple the touchpad 16 to the rigid housing, such as leaf springs, foam, flexures, or other compliant materials.

In some embodiments, the user is able to push the touchpad 16 along the z-axis to provide additional input to the computer 10. For example, a sensor can be used to detect the position of the touchpad 16 along the z-axis, such as an optical sensor, magnetic sensor, Polhemus sensor, and the like. The position on the z-axis can be used to provide proportional input to the computer, for example. In addition, other types of forces can be output along the z-axis, such as spring forces, damping forces, inertial forces, and other position-based forces, as disclosed in U.S. Pat. No. 6,563,487. In addition, 3-D elevations can be simulated in the graphical environment by moving the pad to different elevations along the z-axis. If the pad 16 can be used as an analog input depending on the distance the entire pad is moved along the z-axis, and/or if kinesthetic (force) feedback is applied in the z-axis degree of freedom, then a greater range of motion for the pad 16 along the z-axis is desirable. An elastomeric layer can be provided if the touchpad 16 is able to be pressed by the user to close a switch and provide button or switch input to the computer 10 (e.g., using contact switches, optical switches, or the like). If such z-axis movement of the pad 16 is allowed, it is preferred that the z-axis movement require a relatively large amount of force to move the pad at least initially, since such z-axis movement may not be desired during normal use of the pad by the user.

The voice coil actuator 54 preferably includes a coil and a magnet, where a current is flowed through the coil and interacts with the magnetic field of the magnet to cause a force on the moving portion of the actuator (the coil or the magnet, depending on the implementation), as is well known to those skilled in the art and is described in, for example, U.S. Pat. No. 6,184,868. Other types of actuators can also be used, such as a standard speaker, an E-core type actuator (as described in U.S. Pat. No. 6,704,001, which is hereby incorporated herein by reference as if set forth fully herein), a solenoid, a pager motor, a DC (direct current) motor, moving magnet actuator (described for example in U.S. Pat. No. 6,704,001, or other type of actuator. Furthermore, the actuator can be positioned to output linear motion along an axis perpendicular to the z-axis or along another direction different from the z-axis (rotary or linear), where a mechanism converts such output motion to linear motion along the z-axis as is well known to those skilled in the art.

The touchpad 16 can also be integrated with an elastomeric layer and/or a printed circuit board in a sub-assembly, where one or more actuators are coupled to the printed circuit board to provide tactile sensations to the touchpad 16. Helical springs can also be provided to engage electrical contacts. Or, multiple voice coil actuators can be positioned at different locations under the touchpad 16. These embodiments are described in U.S. Pat. No. 6,563,487. Any of the actuators described in that copending application can also be used in the present invention.

Figure 6:
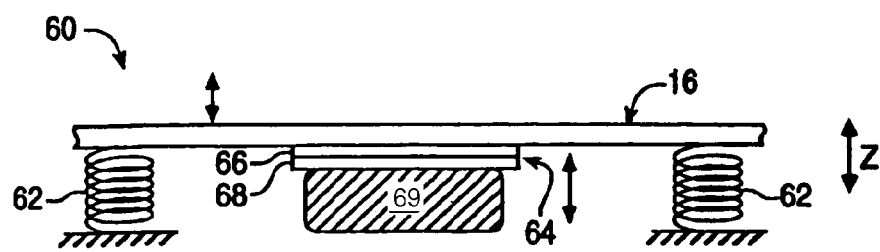
FIG. 6 is a side elevational view of a third embodiment of the touchpad of the present invention having an inertial mass.

FIG. 6 is a side elevational view of a third embodiment 60 of the haptic touchpad 16 of the present invention. In this embodiment, the stationary portion of the actuator is coupled to the touchpad 16, and the moving portion of the actuator is coupled to an inertial mass to provide inertial haptic sensations.

Touchpad 16 can be compliantly mounted to the rigid housing of the computer device similarly to the embodiments described above. For example, one or more spring elements 62 can be coupled between the touchpad and the housing. These springs can be helical or leaf springs, a compliant material such as rubber or foam, flexures, and the like.

One or more actuators 64 are coupled to the underside of the touchpad 16. In the embodiment of FIG. 6, a piezo-electric actuator is shown. One portion 66 of each actuator 64 is coupled to the touchpad 16, and the other portion 68 is coupled to a mass 69. Thus, when the portion 68 is moved relative to the portion 66, the mass 69 is moved with the portion 68. The mass 69 can be any suitable object of the desired weight, such as plastic or metal material. The mass 69 is moved approximately along the z-axis and is not coupled to the housing, allowing free motion. The motion of the mass 69 along the z-axis causes an inertial force that is transmitted through the actuator 64 to the touchpad 16, and the touchpad 16 moves along the z-axis due to the compliant coupling 62. The motion of the touchpad 16 is felt by the user contacting the touchpad 16 as a haptic sensation.

In different embodiments, other types of actuators can be used. For example, a linear voice coil actuator as described for FIG. 5 can be used, in which an inertial mass is coupled to the linear-moving portion of the voice coil actuator. Other actuators can also be used, such as solenoids, pager motors, moving magnet actuators, E-core actuators, and the like. Many actuators used for inertial haptic sensations are described in copending U.S. Pat. No. 6,211,861, which is hereby incorporated herein by reference as if set forth fully herein. Furthermore, a rotary actuator can be used, where the rotary output force is converted to a linear force approximately along the z-axis. For example, the rotary force can be converted using a flexure, as described for example in U.S. Pat. Nos. 6,693,626 and 6,697,043, both of which are hereby incorporated herein by reference as if set forth fully herein.

In the preferred linear force implementation, the direction or degree of freedom that the force is applied on the touchpad with respect to the inertial mass is important. If a significant component of the force is applied in the planar workspace of the touchpad (i.e., along the X or Y axis) with respect to the inertial mass, a short pulse or vibration can interfere with the user's object motion in one or both of those planar degrees of freedom and thereby impair the user's ability to accurately guide a controlled graphical object, such as a cursor, to a given target. Since a primary function of the touchpad is accurate targeting, a tactile sensation that distorts or impairs targeting, even mildly, is undesirable. To solve this problem, the touchpad device of the present invention applies inertial forces substantially along the Z axis, orthogonal to the planar X and Y axes of the touchpad surface. In such a configuration, tactile sensations can be applied at a perceptually strong level for the user without impairing the ability to accurately position a user controlled graphical object in the X and Y axes of the screen. Furthermore, since the tactile sensations are directed in a third degree of freedom relative to the two-dimensional planar workspace and display screen, jolts or pulses output along the Z axis feel much more like three-dimensional bumps or divots to the user that come "out" or go "into" the screen, increasing the realism of the tactile sensations and creating a more compelling interaction. For example, an upwardly-directed pulse that is output when the cursor is moved over a window border creates the illusion that the user is moving a finger or other object "over" a bump at the window border.

Figure 7:
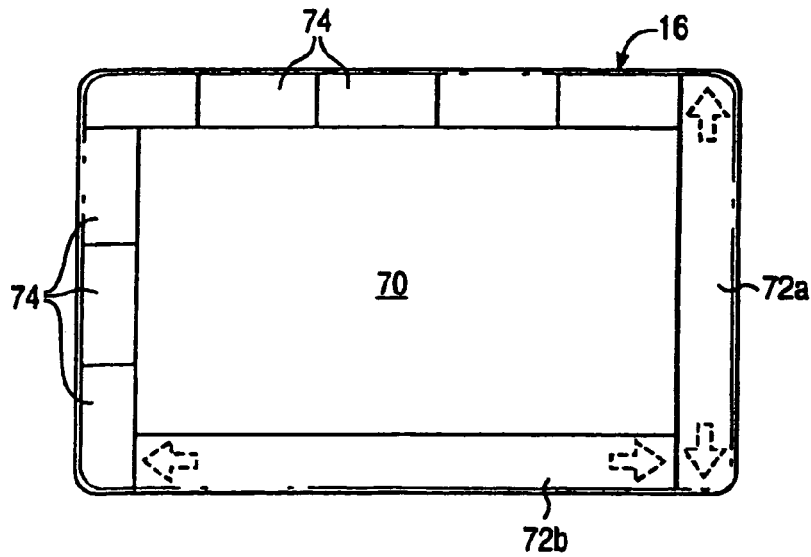
FIG. 7 is a top plan view of an example of a touchpad of the present invention having different control regions.

FIG. 7 is a top elevational view of the touchpad 16 of the present invention. Touchpad 16 can in some embodiments be used simply as a positioning device, where the entire area of the pad provides cursor control. In other embodiments, different regions of the pad can be designated for different functions. In some of these region embodiments, each region can be provided with an actuator located under the region, while other region embodiments may use a single actuator that imparts forces on the entire pad 16. In the embodiment shown, a central cursor control region 70 is used to position the cursor.

The cursor control region 70 of the pad 16 can cause forces to be output on the pad based on interactions of the controlled cursor with the graphical environment and/or events in that environment. The user moves a finger or other object within region 70 to correspondingly move the cursor 20. Forces are preferably associated with the interactions of the cursor with displayed graphical objects. For example, a jolt or "pulse" sensation can be output, which is a single impulse of force that quickly rises to the desired magnitude and then is turned off or quickly decays back to zero or small magnitude. The touchpad 16 can be jolted in the z-axis to provide the pulse. A vibration sensation can also be output, which is a time-varying force that is typically periodic. The vibration can cause the touchpad 16 or portions thereof to oscillate back and forth on the z axis, and can be output by a host or local microprocessor to simulate a particular effect that is occurring in a host application.

Another type of force sensation that can be output on the touchpad 16 is a texture force. This type of force is similar to a pulse force, but depends on the position of the user's finger on the area of the touchpad and/or on the location of the cursor in the graphical environment. Thus, texture bumps are output depending on whether the cursor has moved over a location of a bump in a graphical object. This type of force is spatially-dependent, i.e., a force is output depending on the location of the cursor as it moves over a designated textured area; when the cursor is positioned between "bumps" of the texture, no force is output, and when the cursor moves over a bump, a force is output. This can be achieved by host control (e.g., the host sends the pulse signals as the cursor is dragged over the grating). In some embodiments, a separate touchpad microprocessor can be dedicated for haptic feedback with the touchpad, and the texture effect and be achieved using local control (e.g., the host sends a high level command with texture parameters and the sensation is directly controlled by the touchpad processor). In other cases a texture can be performed by presenting a vibration to a user, the vibration being dependent upon the current velocity of the user's finger (or other object) on the touchpad. When the finger is stationary, the vibration is deactivated; as the finger is moved faster, the frequency and magnitude of the vibration is increased. This sensation can be controlled locally by the touchpad processor (if present), or be controlled by the host. Local control by the pad processor may eliminate communication burden in some embodiments. Other spatial force sensations can also be output. In addition, any of the described force sensations herein can be output simultaneously or otherwise combined as desired.

Different types of graphical objects can be associated with tactile sensations. Tactile sensations can output on the touchpad 16 based on interaction between a cursor and a window. For example, a z-axis "bump" or pulse can be output on the touchpad to signal the user of the location of the cursor when the cursor is moved over a border of a window. When the cursor is moved within the window's borders, a texture force sensation can be output. The texture can be a series of bumps that are spatially arranged within the area of the window in a predefined pattern; when the cursor moves over a designated bump area, a bump force is output on the touchpad. A pulse or bump force can be output when the cursor is moved over a selectable object, such as a link in a displayed web page or an icon. A vibration can also be output to signify a graphical object which the cursor is currently positioned over. Furthermore, features of a document displaying in a window can also be associated with force sensations. For example, a pulse can be output on the touchpad when a page break in a document is scrolled past a particular area of the window. Page breaks or line breaks in a document can similarly be associated with force sensations such as bumps or vibrations.

Furthermore, a menu items in a displayed menu can be selected by the user after a menu heading or graphical button is selected. The individual menu items in the menu can be associated with forces. For example, vertical (z-axis) bumps or pulses can be output when the cursor is moved over the border between menu items. The sensations for certain menu choices can be stronger than others to indicate importance or frequency of use, i.e., the most used menu choices can be associated with higher-magnitude (stronger) pulses than the less used menu choices. Also, currently-disabled menu choices can have a weaker pulse, or no pulse, to indicate that the menu choice is not enabled at that time. Furthermore, when providing tiled menus in which a sub-menu is displayed after a particular menu element is selected, as in Microsoft Windows™, pulse sensations can be sent when a sub-menu is displayed. This can be very useful because users may not expect a sub-menu to be displayed when moving a cursor on a menu element. Icons can be associated with textures, pulses, and vibrations similarly to the windows described above. Drawing or CAD programs also have many features which can be associated with similar haptic sensations, such as displayed (or invisible) grid lines or dots, control points of a drawn object, and the like.

In other related interactions, when a rate control or scrolling function is performed with the touchpad (through use of the cursor), a vibration can be displayed on the device to indicate that scrolling is in process. When reaching the end of a numerical range that is being adjusted (such as volume), a pulse can be output to indicate that the end of the range has been reached. Pulse sensations can be used to indicate the location of the "ticks" for discrete values or settings in the adjusted range. A pulse can also be output to inform the user when the center of the range is reached. Different strength pulses can also be used, larger strength indicating the more important ticks. In other instances, strength and/or frequency of a vibration can be correlated with the adjustment of a control to indicate current magnitude of the volume or other adjusted value. In other interactions, a vibration sensation can be used to indicate that a control function is active. Furthermore, in some cases a user performs a function, like selection or cutting or pasting a document, and there is a delay between the button press that commands the function and the execution of the function, due to processing delays or other delays. A pulse sensation can be used to indicate that the function (the cut or paste) has been executed.

Furthermore, the magnitude of output forces on the touchpad can depend on the event or interaction in the graphical environment. For example, the force pulse can be a different magnitude of force depending on the type of graphical object encountered by the cursor. For example, pulses of higher magnitude can be output when the cursor moves over windows, while pulses of lower magnitude can be output when the cursor moves over icons. The magnitude of the pulses can also depend on other characteristics of graphical objects, such as an active window as distinguished a background window, file folder icons of different priorities designated by the user, icons for games as distinguished from icons for business applications, different menu items in a drop-down menu, etc. The user or developer can also preferably associate particular graphical objects with customized haptic sensations.

User-independent events can also be relayed to the user using haptic sensations on the touchpad. An event occurring within the graphical environment, such as an appointment reminder, receipt of email, explosion in a game, etc., can be signified using a vibration, pulse, or other time-based force. The force sensation can be varied to signify different events of the same type. For example, vibrations of different frequency can each be used to differentiate different events or different characteristics of events, such as particular users sending email, the priority of an event, or the initiation or conclusion of particular tasks (e.g. the downloading of a document or data over a network). When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over.

A software designer may want to allow a user to be able to select options or a software function by positioning a cursor over an area on the screen using the touchpad, but not require pressing a physical button or tapping the touchpad to actually select the option. Currently, it is problematic to allow such selection because a user has physical confirmation of execution when pressing a physical button. A pulse sent to the touchpad of the present invention can act as that physical confirmation without the user having to press a button or other control for selection. For example, a user can position a cursor over a web page element, and once the cursor is within the desired region for a given period of time, an associated function can be executed. This is indicated to the user through a tactile pulse sent to the pad 16.

The above-described force sensations can also be used in games or simulations. For example, a vibration can be output when a user-controlled racing car is driving on a dirt shoulder of a displayed road, a pulse can be output when the car collides with another object, and a varying-frequency vibration can be output when a vehicle engine starts and rumbles. The magnitude of pulses can be based on the severity of a collision or explosion, the size of the controlled graphical object or entity (and/or the size of a different graphical object/ entity that is interacted with), etc. Force sensations can also be output based on user-independent events in the game or simulation, such as pulses when bullets are fired at the user's character.

The above haptic sensations can be similar to those described in copending patent application Ser. No. 09/253, 132, and application Ser. No. 09/456,887, "Tactile Mouse Device," filed Jan. 7, 1999, which are both incorporated herein by reference. Other control devices or grips that can include a touchpad 16 of the present invention in its housing include a gamepads, mouse or trackball device for manipulating a cursor or other graphical objects in a computer-generated environment; or a pressure sphere or the like. For example, the touchpad 16 can be provided on the housing of a computer mouse to provide additional input to the host computer. Furthermore, selective disturbance filtering of forces, as described in copending patent application Ser. No. 08/839,249, and shaping of force signals to drive the touchpad with impulse waves as described in Pat. No. 5,959,613, can be used with the present invention, both disclosures incorporated herein by reference. Such impulses are also effective when driven with stored power in a battery on the computer 10 or from a bus such a USB connected to a host computer.

The touchpad 16 can also be provided with different control regions that provide separate input from the main cursor control region 70. In some embodiments, the different regions can be physically marked with lines, borders, or textures on the surface of the pad 16 (and/or sounds from the computer 10) so that the user can visually, audibly, and/or or tactility tell which region he or she is contacting on the pad.

For example, scroll or rate control regions 72a and 72b can be used to provide input to perform a rate control task, such as scrolling documents, adjusting a value (such as audio volume, speaker balance, monitor display brightness, etc.) or panning/ tilting the view in a game or virtual reality simulation. Region 72a can be used by pacing a finger (or other object) within the region, where the upper portion of the region will increase the value, scroll up, etc., and the lower portion of the region will decrease the value, scroll down, etc. In embodiments that can read the amount of pressure placed on the pad 16, the amount of pressure can directly control the rate of adjustment; e.g., a greater pressure will cause a document to scroll faster. The region 72b can similarly be used for horizontal (left/right) scrolling or rate control adjustment of a different value, view, etc.

Particular haptic effects can be associated with the control regions 72a and 72b. For example, when using the rate control region 72a and 72b, a vibration of a particular frequency can he output on the pad 16. In those embodiments having multiple actuators, an actuator placed directly under the region 72a and 72b can be activated to provide a more localized tactile sensation for the "active" (currently used) region. As a portion of a region 72 is pressed for rate control, pulses can be output on the pad (or region of the pad) to indicate when a page has scrolled by, a particular value has passed, etc. A vibration can also be continually output whine the user contacts the region 72a and 72b.

Other regions 74 can also be positioned on the touchpad 16. For example, each of regions 74 provides a small rectangular area, like a button, which the user can point to in order to initiate a function associated with the pointed-to region. The regions 74 can initiate such computer functions as running a program, opening or closing a window, going "forward" or "back" in a queue of web pages in a web browser, powering the computer 10 or initiating a "sleep" mode, checking mail, firing a gun in a game, cutting or pasting data from a buffer, selecting a font, etc. The regions 74 can duplicate functions and buttons provided in an application program or provide new, different functions.

Similarly to regions 72, the regions 74 can each be associated with haptic sensations; for example, a region 74 can provide a pulse sensation when it has been selected by the user, providing instant feedback that the function has been selected. Furthermore, the same types of regions can be associated with similar-feeling haptic sensations. For example, each word-processor related region 74 can, when pointed to, cause a pulse of a particular strength, while each game-related region can provide a pulse of different strength or a vibration. Furthermore, when the user moves the pointing object from one region 72 or 74 to another, a haptic sensation (such as a pulse) can be output on the pad 16 to signify that a region border has been crossed.

In addition, the regions are preferably programmable in size and shape as well as in the function with which they are associated. Thus, the functions for regions 74 can change based on an active application program in the graphical environment and/or based on user preferences input to and/or stored on the computer 10. Preferably, the size and location of each of the regions can be adjusted by the user or by an application program, and any or all of the regions can be completely removed if desired. Furthermore, the user is preferably able to assign particular haptic sensations to particular areas or types of areas based on types of functions associated with those areas, as desired. Different haptic sensations can be designed in a tool such as IMMERSION STUDIO available from Immersion Corp. of San Jose, Calif.

It should be noted that the regions 72 and 74 need not be physical regions of the touchpad 16. That is, the entire touchpad 16 surface need merely provide coordinates of user contact to the processor of the computer and software on the computer can designate where different regions are located. The computer can interpret the coordinates and, based on the location of the user contact, can interpret the touchpad input signal as a cursor control signal or a different type of signal, such as rate control, button function, etc. The local touchpad microprocessor, if present, may alternatively interpret the function associated with the user contact location and report appropriate signal or data to the host processor (such as position coordinates or a button signal), thus keeping the host processor ignorant of the lower level processing. In other embodiments, the touchpad 16 can be physically designed to output different signals to the computer based on different regions marked on the touchpad surface that are contacted by the user; e.g. each region can be sensed by a different sensor or sensor array.

Figure 8A:
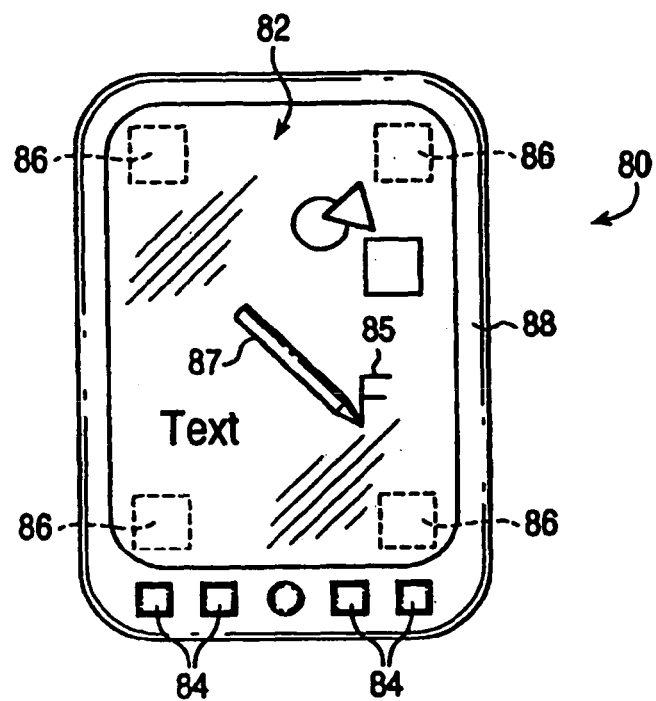
FIGS. 8A and 8B are top plan and side cross sectional views, respectively, of a touch screen embodiment of the present invention.
Figure 8B:
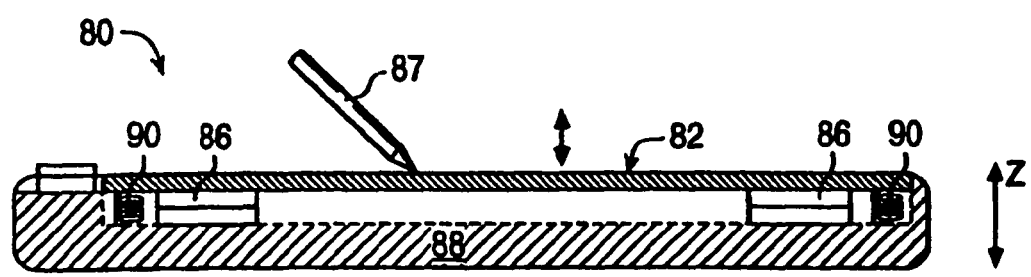

FIGS. 8a and 8b are top plan and side cross-sectional views, respectively, of another computer device embodiment 80 including a form of the haptic touchpad 16 of the present invention. Device 80 is in the form of a portable computer device such as "personal digital assistant" (PDA), a "pen-based" computer, "electronic book", or similar device (collectively known as a "personal digital assistant" or PDA herein). Those devices which allow a user to input information by touching a display screen or readout in some fashion are primarily relevant to this embodiment of the present invention. Such devices can include the Palm Pilot from 3Com Corp., the Newton from Apple Computer, pocket-sized computer devices from Casio, Hewlett-Packard, or other manufacturers, cellular phones or pagers having touch screens, etc.

In one embodiment of a device 80, a display screen 82 typically covers a large portion of the surface of the computer device 80. Screen 82 is preferably a flat-panel display as is well known to those skilled in the art and can display text, images, animations, etc.; in some embodiments screen 80 is as functional as any personal computer screen. Display screen 82 is preferably a "touch screen" that includes sensors which allow the user to input information to the computer device 80 by physically contacting the screen 80 (i.e. it is another form of planar "touch device" similar to the touchpad 16). For example, a transparent sensor film can be overlaid on the screen 80, where the film can detect pressure from an object contacting the film. The sensor devices for implementing touch screens are well known to those skilled in the art.

The user can select graphically-displayed buttons or other graphical objects by pressing a finger or a stylus to the screen 82 at the exact location where the graphical object is displayed. Furthermore, some embodiments allow the user to "draw" or "write" on the screen by displaying graphical "ink" images 85 at locations where the user has pressed a tip of a stylus, finger, or other object. Handwritten characters can be recognized by software running on the device microprocessor as commands, data, or other input. In other embodiments, the user can provide input additionally or alternatively through voice recognition, where a microphone on the device inputs the user's voice which is translated to appropriate commands or data by software running on the device. Physical buttons 84 can also be included in the housing of the device 80 to provide particular commands to the device 80 when the buttons are pressed. Many PDA's are characterized by the lack of a standard keyboard for character input from the user; rather, an alternative input mode is used, such as using a stylus to draw characters on the screen, voice recognition, etc. However, some PDA's also include a fully-functional keyboard as well as a touch screen, where the keyboard is typically much smaller than a standard-sized keyboard. In yet other embodiments, standard-size laptop computers with standard keyboards may include flat-panel touch-input display screens, and such screens (similar to screen 12 of FIG. 1) can be provided with haptic feedback according to the present invention.

In the present invention, the touch screen 82 provides haptic feedback to the user similarly to the touchpad 16 described in previous embodiments. One or more actuators 86 can be coupled to the underside of the touch screen 82 to provide haptic feedback such as pulses, vibrations, and textures; for example, an actuator 86 can be positioned near each corner of the screen 82, as shown in FIG. 8a. Other configurations of actuators can also be used. The user can experience the haptic feedback through a finger or a held object such as a stylus 87 that is contacting the screen 82.

As shown in FIG. 8b, the touch screen 82 is preferably coupled to the housing 88 of the device 80 by one or more spring or compliant elements 90, such as helical springs, leaf springs, flexures, or compliant material (foam, rubber, etc.) The compliant element allows the touch screen 82 to move approximately along the z-axis, thereby providing haptic feedback similarly to the touchpad embodiments described above. Actuators 86 can be piezoelectric actuators, voice coil actuators, or any of the other types of actuators described above for the touchpad embodiments. As shown in FIG. 8b, the actuators 86 are directly coupled to the touch screen 82 similarly to the touchpad embodiment of FIG. 3; alternatively, an inertial mass can be moved to provide inertial feedback in the z-axis of the touch screen, similarly to the touchpad embodiment of FIG. 6. Other features described above for the touchpad are equally applicable to the touch screen embodiment 80.

In the embodiments of touch input devices (touchpad and touch screen) described herein, it is also advantageous that contact of the user is detected by the touch input device. Since haptic feedback need only be output when the user is contacting the touch device, this detection allows haptic feedback to be stopped (actuators "turned off") when no objects are contacting the touch input device. This feature can conserve battery power for portable devices. If a local touch device microprocessor (or similar circuitry) is being used in the computer, such a microprocessor can turn off actuator output when no user contact is sensed, thus alleviating the host processor of additional computational burden.

One specific application of haptic feedback is to provide a realistic emulation of a button press (and release) to the operator, for example of a snap button associated with an icon displayed on the touch pad of the computer or laptop, or on the touch screen of a similar device. In this case, a graphical representation of a button can be displayed on the touch pad. When that graphical representation is touched and/or pressed, either directly by the operator's finger or indirectly using a stylus or similar object, a haptic response is generated by the touchpad which simulates the feel of a snap button.

Figure 9:
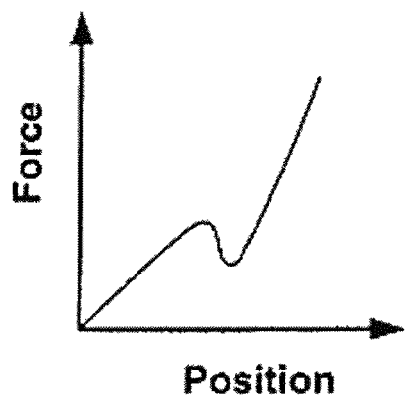
FIG. 9 is a plot of force versus position illustrating a force profile typical of a conventional snap-type button.

Nearly all buttons, not only snap buttons, have a fixed tactile feel dictated by their mechanical construction. This feel is describable by a force profile that relates the amount of depression of the button (position) to a force. As an example, a typical snap button would have force profile similar to that shown in FIG. 9.

Figure 10:
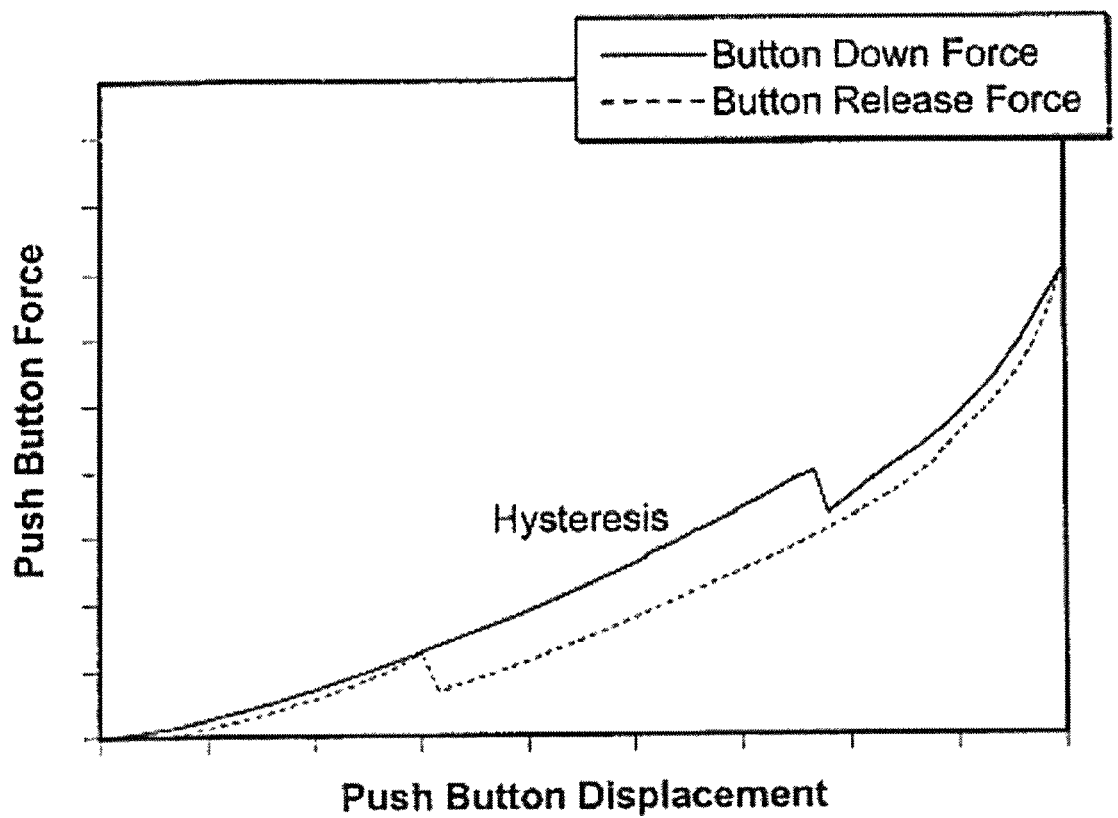
FIG. 10 is a plot of push button force versus push button displacement illustrating hysteresis in a typical push button.

Mechanical buttons provide a click sensation while pressed down and a similar sensation when released, typically with some hysteresis between the two force profiles, as seen in FIG. 10. Assigning a haptic effect to both the push down and release touchscreen events allows for better recreation of the feel of a mechanical button, especially when the operator rests his/her finger or the stylus lightly on the surface.

Even when the user removes his fingers, the forces can still be felt. The button up event in the graphical user interface or display is triggered when a pressure threshold is crossed so the user is still momentarily touching the touch screen when the button up or release effect is played.

A single effect can be used for both the button down and button up effects, or different effects can be used to capture some of the hysteresis effects in real mechanical buttons.

In touch screens designed to operate in open-loop control fashion, whether moving from side to side, up and down or out of the plane, short bursts of periodic signals such as square or sine waves can be used to simulate the sensation of a button click event. In such waveforms, the discontinuities, or rapid changes in direction, create a significant sensation to the user. One issue with using this type of periodic signals is the presence of multiple discontinuities in the waveform. For example, a square wave pulse first rapidly moves the touch screen in one direction, followed by a direction reversal, followed by movement in the original direction. If the waveform is of sufficient duration, this type of effect result in the user feeling multiple events occurring at each direction change. This can be confusing to the user as typically a mechanical button has a single event tactilely transmitted when the button is pressed down and one upon release.

Figure 11:
FIG. 11 is a plot illustrating a combined sawtooth waveform.
Figure 12:
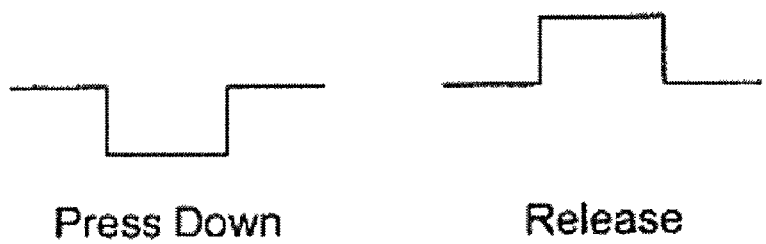
FIG. 12 is a plot illustrating a single pulse waveform in one direction on press down (left plot) followed by a single pulse in the opposite direction on press up (right plot)

To realize the single click event of a typical button, a waveform with a single discontinuity as depicted in FIG. 11 is provided by the invention. This waveform is symmetric so that the final position of the touch screen is relatively close to the original position before the waveform is applied.

Figure 13:
FIG. 13 is a plot of a sawtooth type of single discontinuity waveform.
Figure 15:
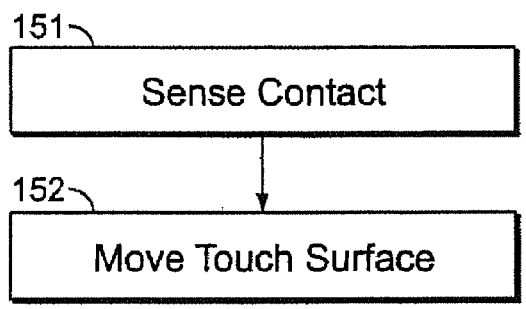
FIG. 15 is a flow diagram showing a method for simulating a button press using haptic feedback imparted through a touch surface.

Other discontinuity waveforms such as a saw-up and saw-down can be used, (See FIG. 13). This in accordance with an aspect of the invention, there is provided a method for simulating a button press using haptic feedback imparted through a touch surface. The method, depicted in FIG. 15, includes sensing a contact with said touch surface (151), and moving (152) the touch surface responsive to the contact in accordance with a first single-discontinuity waveform.

Figure 14:
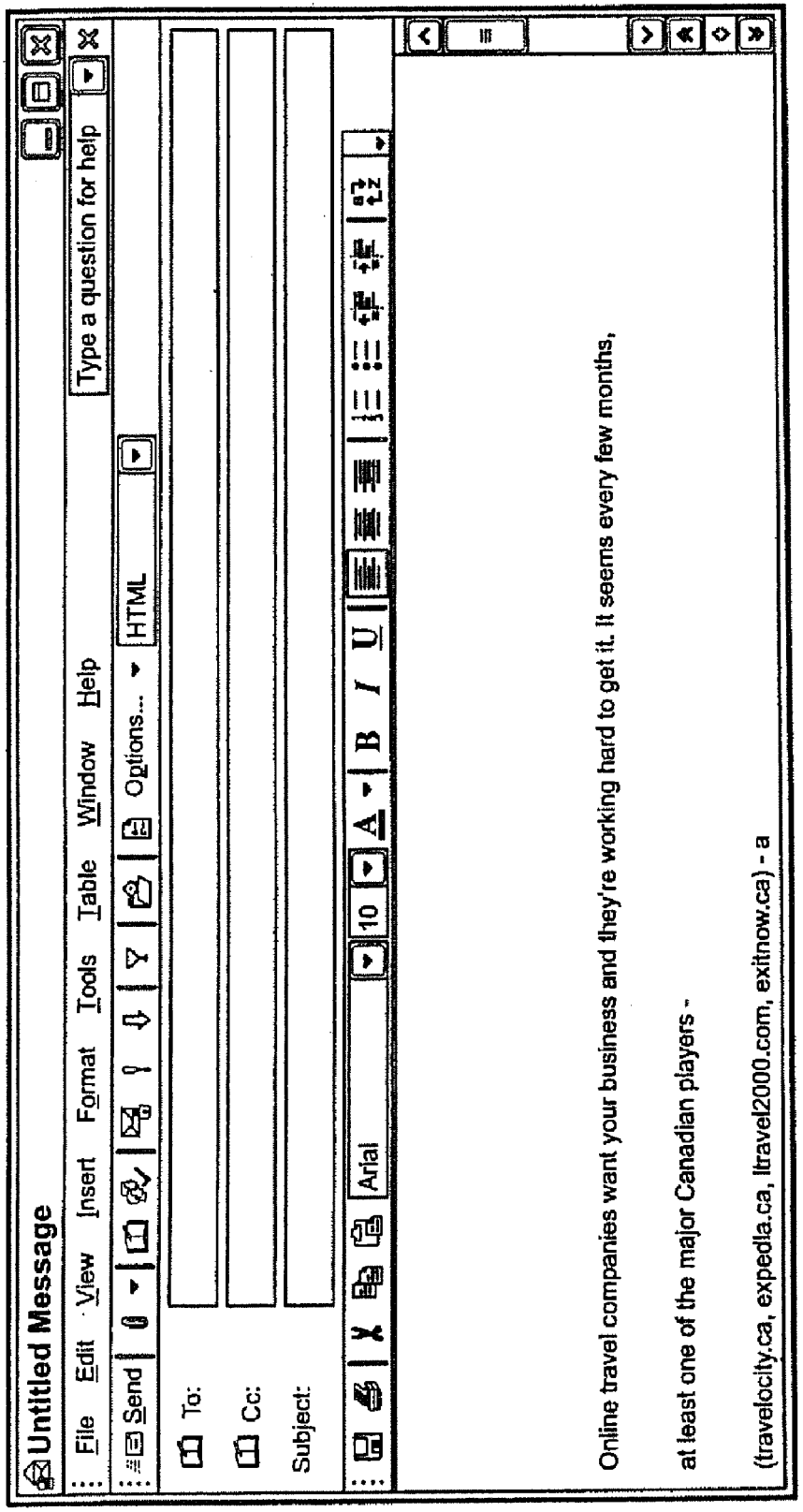
FIG. 14 is a diagram of a screen image showing a scroll bar.

Another specific application of haptic feedback relates to computer graphical user interfaces (GUIs), as explained with reference to laptop computer 10 of FIG. 1. Some buttons displayed in the computer graphical display 12 are used for scrolling up or scrolling down, such as the scroll bar widget of FIG. 14. The widget is manipulated by moving a cursor, for example using touchpad 16, to coincide with the location of the widget on the display. When this occurs, an action is triggered, for example scrolling of the displayed text. It is often difficult to control the scrolling speed to the user's satisfaction. A user will miss the target text because the response is too fast. Conversely, when the response is too slow, the scrolling action takes too much time. Corrections can also take time. In accordance with the invention, on button-down for example—that is, when the cursor is positioned over the scroll button or widget or similar graphical object, a haptic effect can be provided repetitively commensurately with the scrolling action. The frequency of the repetition can be varied according the speed of the scroll, for example, fast pop or fast scrolling.

Figure 16:
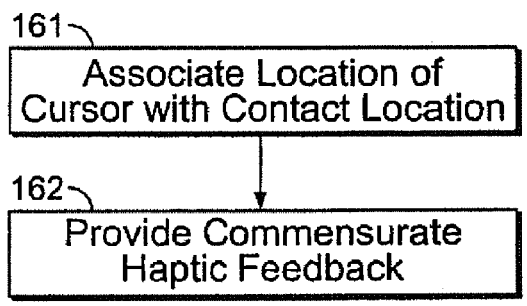
FIG. 16 is a flow diagram showing a method for providing haptic feedback representative of the extent to which an action triggered by manipulation of a cursor relative to a graphical object displayed on a display screen is occurring.

More generally, any action whose extent depends on manipulation of a cursor can be tied to haptic feedback which similarly varies in extent. Thus in accordance with a further aspect of the invention illustrated in FIG. 16, there is provided a method for providing haptic feedback representative of the extent to which an action triggered by manipulation of a cursor relative to a graphical object displayed on a display screen is occurring. The method includes associating (161) the location of the cursor in the display screen with a contact location on a touch screen, and providing (162) haptic feedback by way of the touch screen, the haptic feedback having an extent corresponding to the extent of the action.

Figure 17:
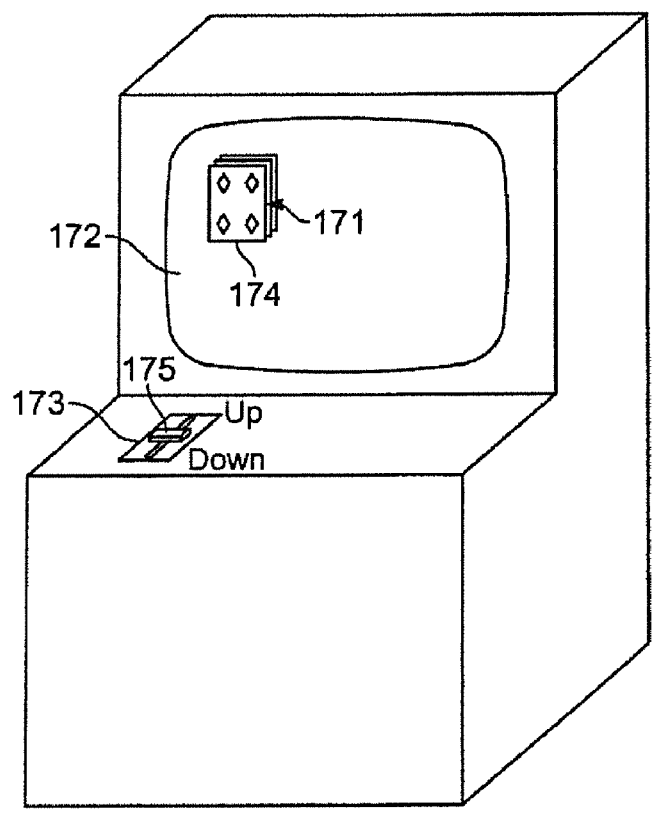
FIG. 17. is a perspective view of video poker game using a slider switch having haptic feedback.

The invention is not limited to applications using a cursor. A graphical object displayed on a display of a computer for example, is manipulated in size, position, orientation, color, and the like by a contact between the user and a touch input device such as a touchpad or touch screen. A characteristic of the manipulation, such as its speed of translation, is correlated with a characteristic of the contact, such as the speed of the user's finger as it moves over the touch input device, and this is reflected in the manner the graphical object is displayed—that is, the speed of the graphical object at it is translated in the graphical environment displayed by the computer display may be set, at least in part, in response to the speed of motion of the user's contact with the touch input device. Moreover, the extend of the haptic feedback provided to the user by way of the touch screen for example is a function of the characteristic of the manipulation. Specifically, if a graphical object is a scroll bar which is being moved by use of the touch screen, then the speed at which it is moved provides the basis for varying the haptic feedback. If the feedback is repetitive clicks, then the faster the scroll bar widget is moved, the faster the clicks the clicks are imparted. The magnitude of the force can be varied in a similar manner, and characteristics other than speed, such as acceleration, deceleration, direction, and so forth can be used. Further, other graphical objects can be manipulated in this manner. For example, with reference to FIG. 17, in a graphical game using a deck of cards 171 displayed on a screen 172 and having an input device such as a sliding a slider switch 173 which, when actuated by the user, causes the portion of the screen 174 in which the deck of cards is displayed to display the cards one after the other in the same location, the rate at which one card replaces the next can be made a function of the position of the slider 175 of the slider switch 173, and haptic feedback imparted to the slider switch can be function of that rate. A similar concept applies to a zoom function of a displayed image, or photo editing program in which colors are manipulated. A color palate can be displayed, and a change in the position of the user's finger on the touch screen or touch pad would cause the addition or subtraction of a color component, and the rate of this addition or subtraction can be used to provide haptic feedback whose extent is commensurate with this rate change.

Figure 18:
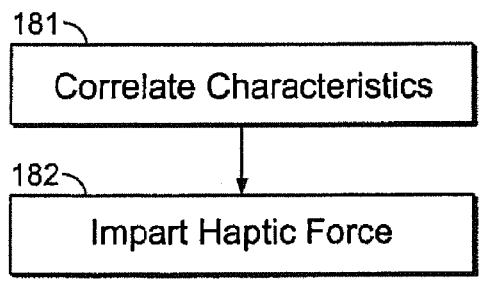
FIG. 18 is a flow diagram showing a method for providing haptic feedback in response to a manipulation of a graphical object.

Thus in accordance with an aspect of the invention, there is provided a method for providing haptic feedback in response to a manipulation of a graphical object. The method, described with reference to FIG. 18, includes correlating (181) a characteristic of the manipulation of the graphical object with a characteristic of a contact of a touch screen, and imparting (182) a force to the touch screen at an extent which varies in accordance with the characteristic of the manipulation.

Figure 19:
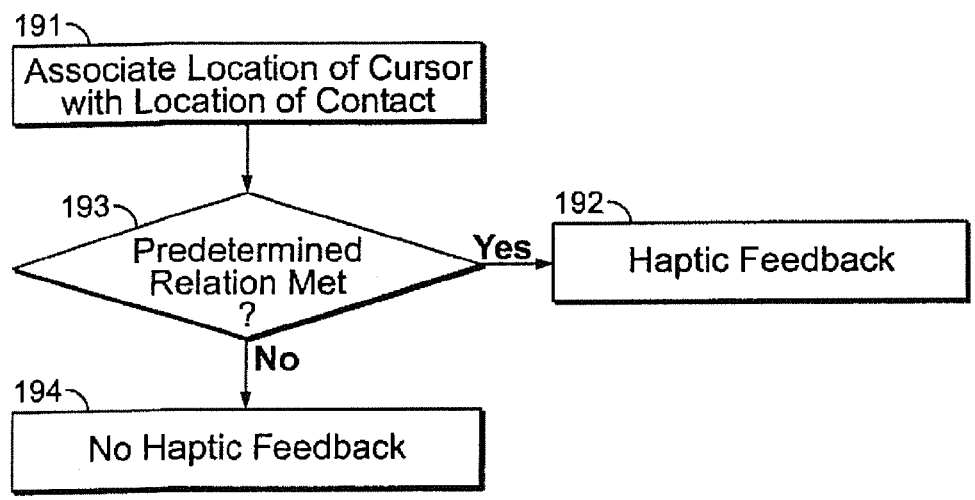
FIG. 19 is a flow diagram showing a method for providing haptic feedback representative of the relative location of a cursor and a graphical object displayed on a display screen.

Touch screens often have scroll bars to display text in a limited view window. When using a touch screen it is difficult for the user to determine if there is engagement with the scroll bar when sliding up or down, particularly if the user's attention is directed to a different part of the display screen, as is often necessary. In accordance with an embodiment of the present invention, a haptic effect can be continuously provided as long as the user is engaged with the scroll bar and discontinued when the user is not engaged, either because of volition, moving the wrong direction, or by not pressing hard enough on a touch screen or touch pad. Thus in accordance with another aspect of the invention, there is provided a method for providing haptic feedback representative of the relative location of a cursor and a graphical object displayed on a display screen. This method, illustrated in FIG. 19, includes associating (191) the location of the cursor in the display screen with a contact location on a touch screen, and providing (192) haptic feedback by way of the touch screen as long as the location of the cursor on the display screen assumes a predetermined relationship (193) with the location of the graphical object on the display screen. Otherwise, the haptic feedback is terminated (194).

Furthermore, the magnitude of output forces on the touchpad can depend on the event or interaction in the graphical environment. For example, the force pulse can be a different magnitude of force depending on the type of graphical object encountered by the cursor. For example, a pulses of higher magnitude can be output when the cursor moves over windows, while pulses of lower magnitude can be output when the cursor moves over icons. The magnitude of the pulses can also depend on other characteristics of graphical objects, such as an active window as distinguished a background window, file folder icons of different priorities designated by the user, icons for games as distinguished from icons for business applications, different menu items in a drop-down menu, and the like. The user or developer can also preferably associate particular graphical objects with customized haptic sensations.

User-independent events can also be relayed to the user using haptic sensations on the touchpad. An event occurring within the graphical environment, such as an appointment reminder, receipt of email, explosion in a game, and the like, can be signified using a vibration, pulse, or other time-based force. The force sensation can be varied to signify different events of the same type. For example, vibrations of different frequency can each be used to differentiate different events or different characteristics of events, such as particular users sending email, the priority of an event, or the initiation or conclusion of particular tasks (e.g., the downloading of a document or data over a network). When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over.

A software designer may want to allow a user to be able to select options or a software function by positioning a cursor over an area on the screen using the touchpad, but not require pressing a physical button or tapping the touchpad to actually select the option. Currently, it is problematic to allow such selection because a user has physical confirmation of execution when pressing a physical button. A pulse sent to the touchpad of the present invention can act as that physical confirmation without the user having to press a button or other control for selection. For example, a user can position a cursor over a web page element, and once the cursor is within the desired region for a given period of time, an associated function can be executed. This is indicated to the user through a tactile pulse sent to the pad 16.

The above-described force sensations can also be used in games or simulations. For example, a vibration can be output when a user-controlled racing car is driving on a dirt shoulder of a displayed road, a pulse can be output when the car collides with another object, and a varying-frequency vibration can be output when a vehicle engine starts and rumbles. The magnitude of pulses can be based on the severity of a collision or explosion, the size of the controlled graphical object or entity (and/or the size of a different graphical object/ entity that is interacted with), and the like. Force sensations can also be output based on user-independent events in the game or simulation, such as pulses when bullets are fired at the user's character.

The above haptic sensations can be similar to those described in U.S. Pat. Nos. 6,243,078 and 6,211,861. Other control devices or grips that can include a touchpad 16 of the present invention in its housing include a game pad, mouse or trackball device for manipulating a cursor or other graphical objects in a computer-generated environment; or a pressure sphere or the like. For example, the touchpad 16 can be provided on the housing of a computer mouse to provide additional input to the host computer. Furthermore, selective disturbance filtering of forces, as described in U.S. Pat. No. 6,020,876, and shaping of force signals to drive the touchpad with impulse waves as described in U.S. Pat. No. 5,959,613, can be used with the present invention. Both of these aforementioned patent disclosures are hereby incorporated herein by reference as if set forth fully herein. Such impulses are also effective when driven with stored power in a battery on the computer 10 or from a bus such as USB connected to a host computer.

Figure 20:
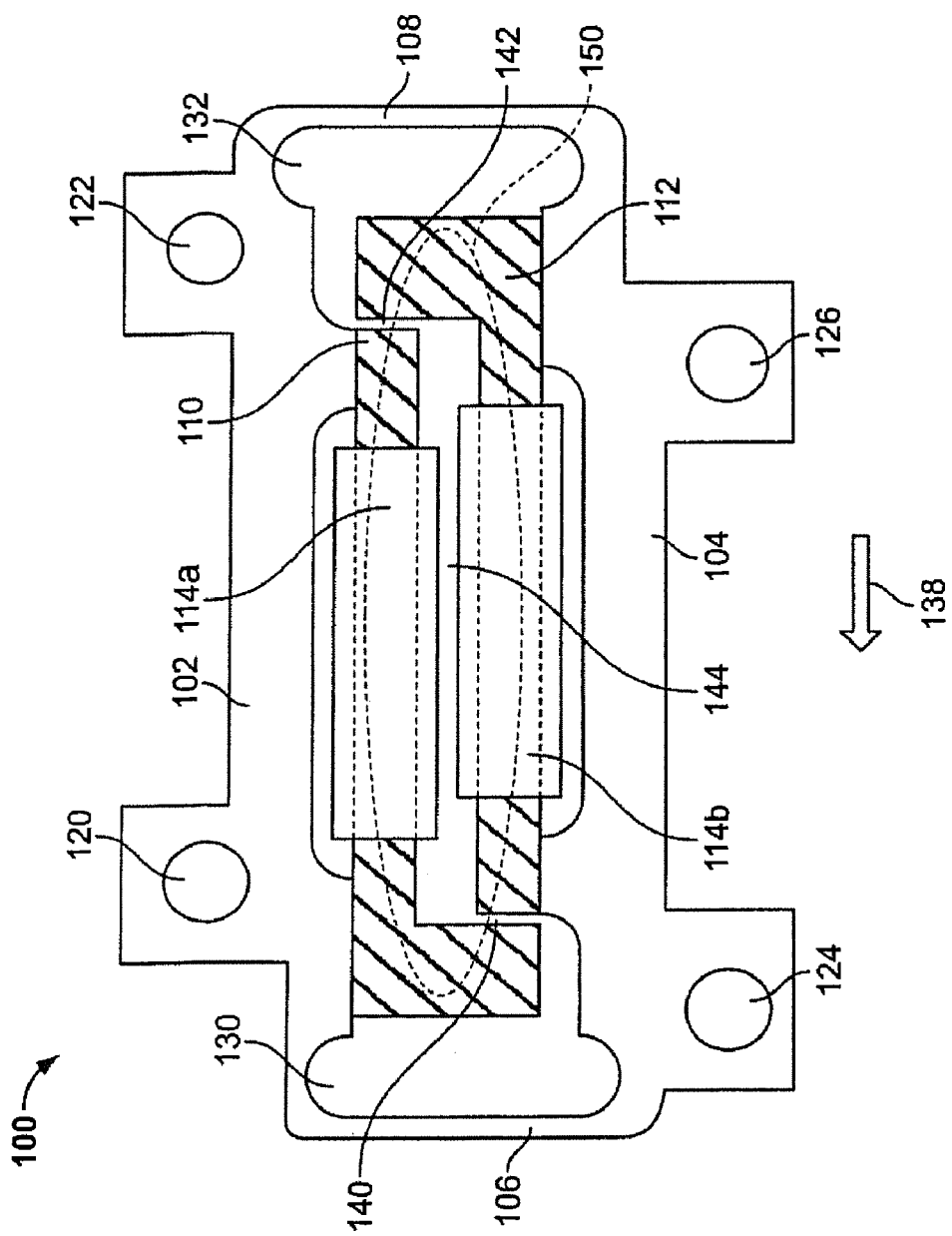
FIG. 20 is an elevational diagram illustrating an actuator for providing haptic effects in accordance with one embodiment of the present invention.

FIG. 20 illustrates an actuator 100 for generating haptic effects in accordance with one embodiment of the present invention useable in connection with a touch screen apparatus. Actuator 100 includes two L-shaped pole pieces 110, 112, first and second structural elements 102 and 104 and first and second biasing elements 106 and 108. Pole pieces 110, 112, may be made of standard magnetic steels with high permeability, or other suitable ferromagnetic materials such as soft magnetic materials with high magnetic permeability (e.g., iron, nickel, magnetic alloys) or sintered materials such as ferrite, as are well known to those of ordinary skill in the art. They need not be made of the same material and they are further coupled to coils 114a, 114b to form electromagnetic devices ("magnetic device"). Coils 114a, 114b, which may be made of copper or other suitable electric conductors, are coupled to one or more current sources for generating magnetic fields when current passes through the coils 114a, 114b. In another embodiment one of the pole pieces need not include a coil as long, as it is formed of a ferromagnetic material.

Actuator 100 further includes structural elements 102, 104 and first and second biasing elements 106, 108 to form a frame for the actuator 100. It should be noted that structural elements 102, 104 and biasing elements 106, 108 can be manufactured out of a single piece of material such as metal or plastic. Alternatively, structural elements 102, 104 and biasing elements 106, 108 may be manufactured independently. First structural element 102, as shown in FIG. 20, includes apertures 120, 122, which are used for coupling or fastening to a housing, a display or a touch-sensitive panel. Similarly, structural element 104 also contains apertures 124, 126 for similar coupling. Structural elements 102, 104 are made of reasonably rigid materials, such as plastic, aluminum, and the like, for providing physical support for the pole pieces 110, 112. Biasing elements 106, 108, which may be springs, flexure springs, flexible blades, flexible members, elastomeric components, foam components, and the like, are made of elastic or relatively flexible materials that can be compressed and/or stretched within a predefined range. In one embodiment the biasing elements 106, 108 and structural elements 102, 104 are made of a plastic material with the biasing elements formed to be made thinner (and hence more flexible) than the structural elements.

Referring again to FIG. 20, pole pieces 110 and 112 are coupled to structural elements 102 and 104, respectively. Pole piece 110 is placed adjacent to pole piece 112 with three magnetic gaps 140, 142 and 144 between the pole pieces 110, 112. The width of the gap 144 situated between the main bodies of the pole pieces 110, 112 is, in one embodiment, in a range of about 1 to about 5 millimeters ("mm"). The width of the gaps 140, 142 is in one embodiment, in a range of about 0.25 to about 0.75 mm. Air pockets 130, 132, which can be of any shape, provide space for pole pieces 110, 112 to move. They are not required, however. Because gaps 140, 142 are much smaller than gap 144 the attractive magnetic force at gaps 140, 142 dominates over any attractive force across gap 144.

In operation, the biasing elements 106, 108 provide minimal force if there is no current passing through the coils 114 and the actuator is (accordingly) in a relaxed state. Under this no power condition, the actuator attains a first equilibrium position as shown, for example, in FIG. 20. When power is applied to coil(s) 114a, 114b an input current passes through the coil(s) creating magnetic flux lines 150 in the pole pieces 110, 112 and across gaps 140, 142. This process acts to generate an attractive force or attractive magnetic force between the pole pieces 110, 112 when the coils are wound so that the electromagnetic effects do not cancel one another. The term attractive force and attractive magnetic force are used interchangeably herein. The attractive magnetic force acts against the biasing elements 106, 108 and pulls the pole pieces 110, 112 closer together at the gaps 140, 142. In accordance with the embodiment shown in FIG. 20, under the attractive magnetic force, with structural element 102 held fixed, the pole piece 112 moves in a direction from right to left (as indicated by arrow 138) toward the pole piece 110. Pole piece 110, in this embodiment, may be fastened or secured to structural element 102, which may be further secured to a housing, touch-sensitive panel or display device. When one of the pole pieces 110, 112 is displaced enough distance within the gaps 140, 142, a second equilibrium position is reached as increasing spring force is applied in an opposite direction by biasing elements 106, 108. When power is then reduced or removed, the biasing elements 106, 108 force the pole pieces 110, 112 back to their original no-power position, also known as the first equilibrium position as described earlier.

It should be noted that the attractive force can be manipulated by varying an amount of current passing through the coils 114a, 114b. Accordingly, the acts of varying the magnitude, duration and pulse repetition of current passing through the coils 114a, 114b can be used to vary the level and quality of sensation provided by the haptic effect. It should be further noted that the haptic effect, which is also known as tactile, force feedback or haptic sensation, can be a pulse, vibration, spatial texture, weight or other physical properties sensible through feeling and touch. The term haptic effect and haptic sensation will be used interchangeably herein.

The present invention allows a user to manipulate the frequency of the movements between the pole pieces 110, 112 by adjusting the periodicity of applied input current. The input current means a current passing through the coils 114a, 114b for generating magnetic fields and magnetic flux in the pole pieces 110, 112 and across the magnetic gaps 140, 142. It should be noted that input currents having different waveform shapes will produce different haptic effect; when an input current is in a square waveform, the haptic effect will be different than when the input current waveform has a sinusoidal shape. In one embodiment, the frequency of haptic effects may have a range between about 40 and about 300 Hertz (Hz).

An advantage of using such a magnetic circuit with an actuator 100 as described above is to efficiently generate force. Unlike other methods, a permanent magnet is not required to implement the present invention. One could be included to add a small magnetic bias to the magnetic circuit, however. Another advantage of actuator 100 is that it may be made very compact in size. For example, in one embodiment actuator 100 may be about 1.5 inches long, 0.6 inches high and 0.3 inches deep. Depending on the orientation of the actuator 100 with respect to a touch-sensitive panel, it can excite either in-plane or out-of-plane motion between the touch-sensitive panel and the display device for haptic sensation. It should be noted that the L-shaped pole pieces as illustrated in FIG. 20 represent merely one embodiment and other arrangements of the pole pieces may also be used although the L-shaped pole pieces are believed to be relatively space efficient for this application.

Figure 21:
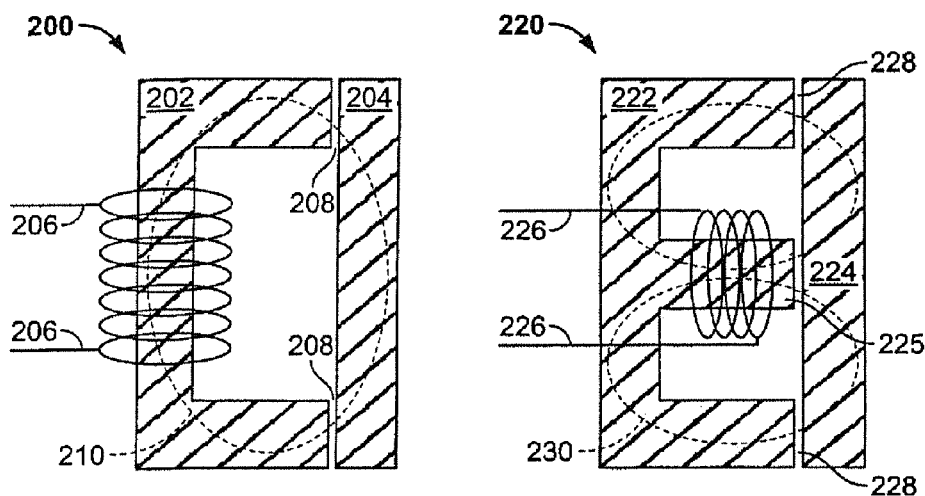
FIG. 21 is an elevational diagram illustrating alternative electromagnetic components for generating attractive magnetic force in an actuator in accordance with one embodiment of the present invention.

FIG. 21 illustrates two alternative embodiments of electromagnet components 200 and 220 capable of generating attractive magnetic force in accordance with the present invention. Electromagnet component 200 includes a C-shaped pole piece 202, an I-shaped pole piece 204, and a single coil 206. Pole pieces 202, 204 may be made of any suitable ferromagnetic materials as discussed above.

C-shaped pole piece 202 is placed adjacent to pole piece 204 with two gaps 208. The width of the gap 208 is approximately 0.5 mm. When the input current passes through the coils 206, a magnetic flux 210 is generated. Magnetic flux 210 generates the attractive magnetic force between the pole pieces 202, 204. The attractive magnetic force causes the pole piece 204 to move closer to the pole piece 202. Alternatively, the attractive magnetic force can cause pole piece 202 to move closer to pole piece 204 if pole piece 204 is relatively fixed. Haptic effects may be generated by the movements caused by the attractive magnetic force between the pole pieces 202, 204.

Electromagnet component 220 includes an E-shaped pole piece 222, an I-shaped pole piece 224, and a coil 226. Pole pieces 222, 224 may be constructed as discussed above.

E-shaped pole piece 222 is placed adjacent to the I-shaped pole piece 224 with a gap 228. The width of the gap 228 is approximately 0.5 mm. When the input current passes through coils 226, magnetic flux lines 230 are generated. Magnetic flux lines 230 cause an attractive magnetic force between pole pieces 222, 224. The attractive magnetic force causes pole piece 224 to move closer to pole piece 222 and effectively narrow the width of the gap 228. In another embodiment, the attractive magnetic force causes the pole piece 222 to move closer to pole piece 224 if pole piece 224 is fastened to housing. A haptic effect may be generated by movements between the pole pieces.

Figure 22:
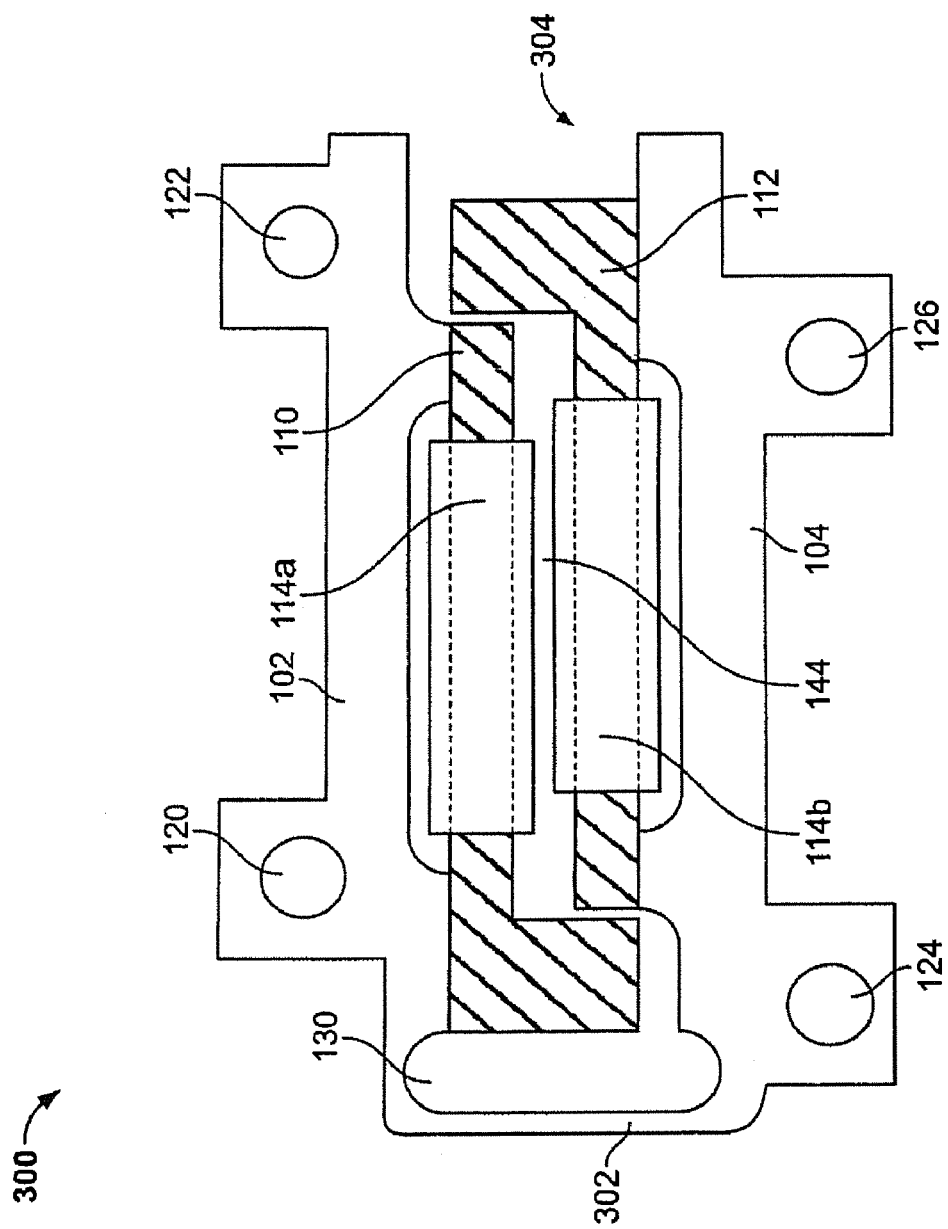
FIG. 22 is an elevational diagram of an alternative embodiment of an actuator in accordance with the present invention.

FIG. 22 is an actuator 300 illustrating an alternative embodiment of the actuator illustrated in FIG. 20 in accordance with one embodiment of the present invention. Actuator 300 includes two L-shaped pole pieces 110, 112, structural elements 102, 104, and biasing element 302. Pole pieces 110, 112 are further coupled to coils. 114a, 114b to form magnetic devices. Coils 114a, 114b are coupled to one or more current sources for causing magnetic flux in pole pieces 110, 112.

Actuator 300 further includes structural elements 102, 104 and biasing element 302 to form a frame. It should be noted that structural elements 102, 104 and biasing element 302 can be manufactured at the same time and on a single frame. Alternatively, structural elements 102, 104 and biasing element 302 may be formed as separate structures that are then assembled together. Structural elements 102, 104 are fabricated or discussed above to provide physical support for the pole pieces 110, 112. Biasing element 302, which may be formed as described above, is made of an elastic material that may be compressed or stretched within a predefined range. Referring to FIG. 22, it should be noted that biasing element 302 may be located anywhere as long as it is coupled with structural elements 102, 104 and provides its biasing or spring function in opposition to the attractive gap-closing magnetic force of the magnetic devices.

Figure 23:
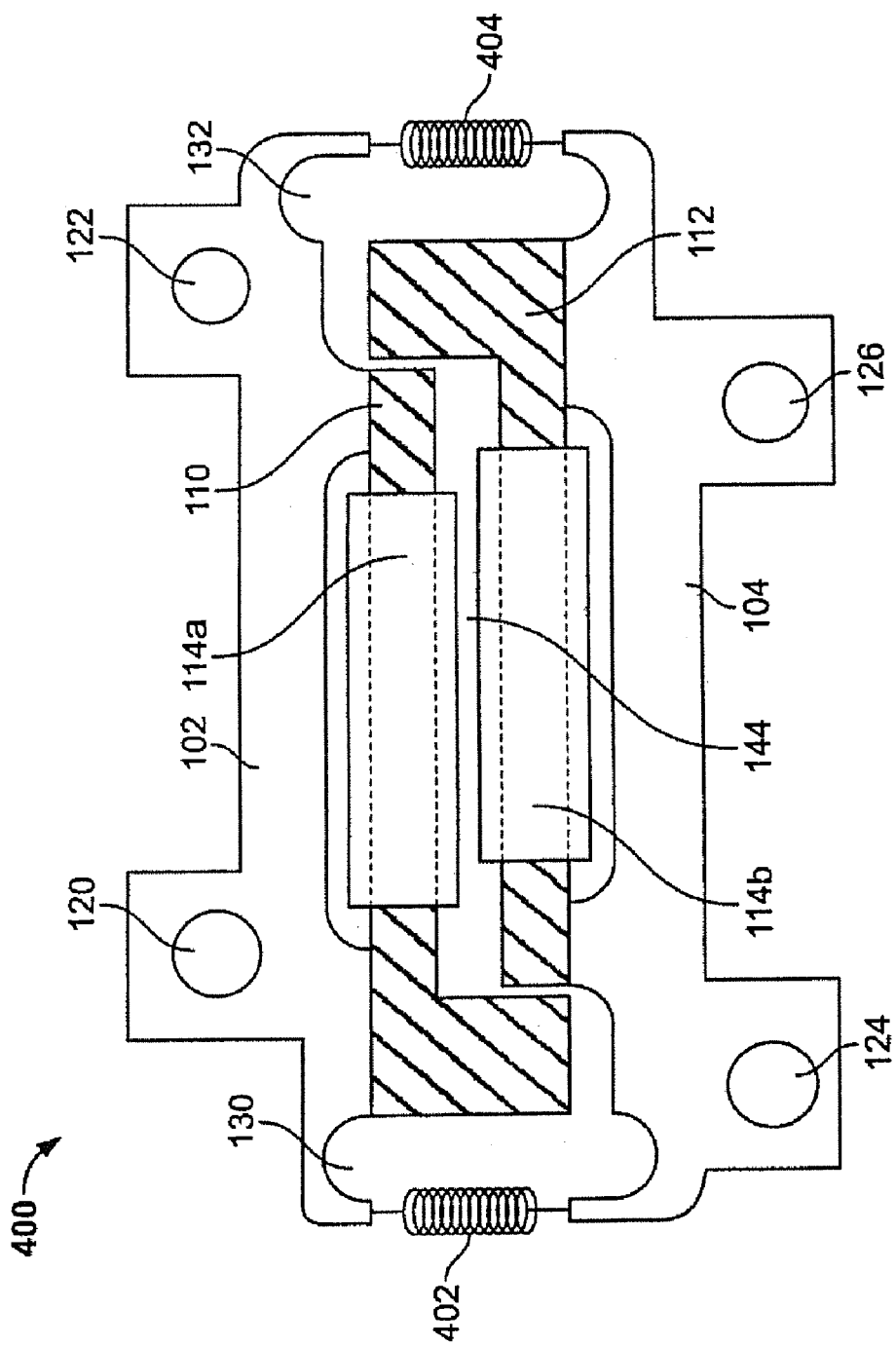
FIG. 23 is an elevational diagram of another embodiment of an actuator in accordance with the present invention.

FIG. 23 is an alternative embodiment of an actuator 400 in accordance with one embodiment of the present invention. Actuator 400 includes two L-shaped pole pieces 110, 112, structural elements 102, 104, and biasing elements 402, 404. Pole pieces 110, 112 are further coupled to coils 114a, 114b to form magnetic devices. Coils 114a, 114b are coupled to one or more current sources for creating magnetic flux in pole pieces 110, 112.

Actuator 400 further includes structural elements 102, 104 and biasing elements 402, 404 to form a frame that allows some movements between the structural elements 102, 104. It should be noted that structural elements 102, 104 and biasing elements 402, 404 are manufactured separately and they need to be assembled to form a frame. Structural elements 102, 104 are made of rigid materials, such as plastic, steel, aluminum, and so forth, to provide physical support for the pole pieces 110, 112. Biasing elements 402, 404 may be implemented as discussed above and may be made of elastic materials that can be compressed or stretched within a predefined range. Referring to FIG. 23, it should be noted that any type of biasing element may be used as long as it facilitates movement between the pole pieces 110, 112 and may be arranged to counter the attractive gap-closing force of the magnetic devices.

Figure 24:
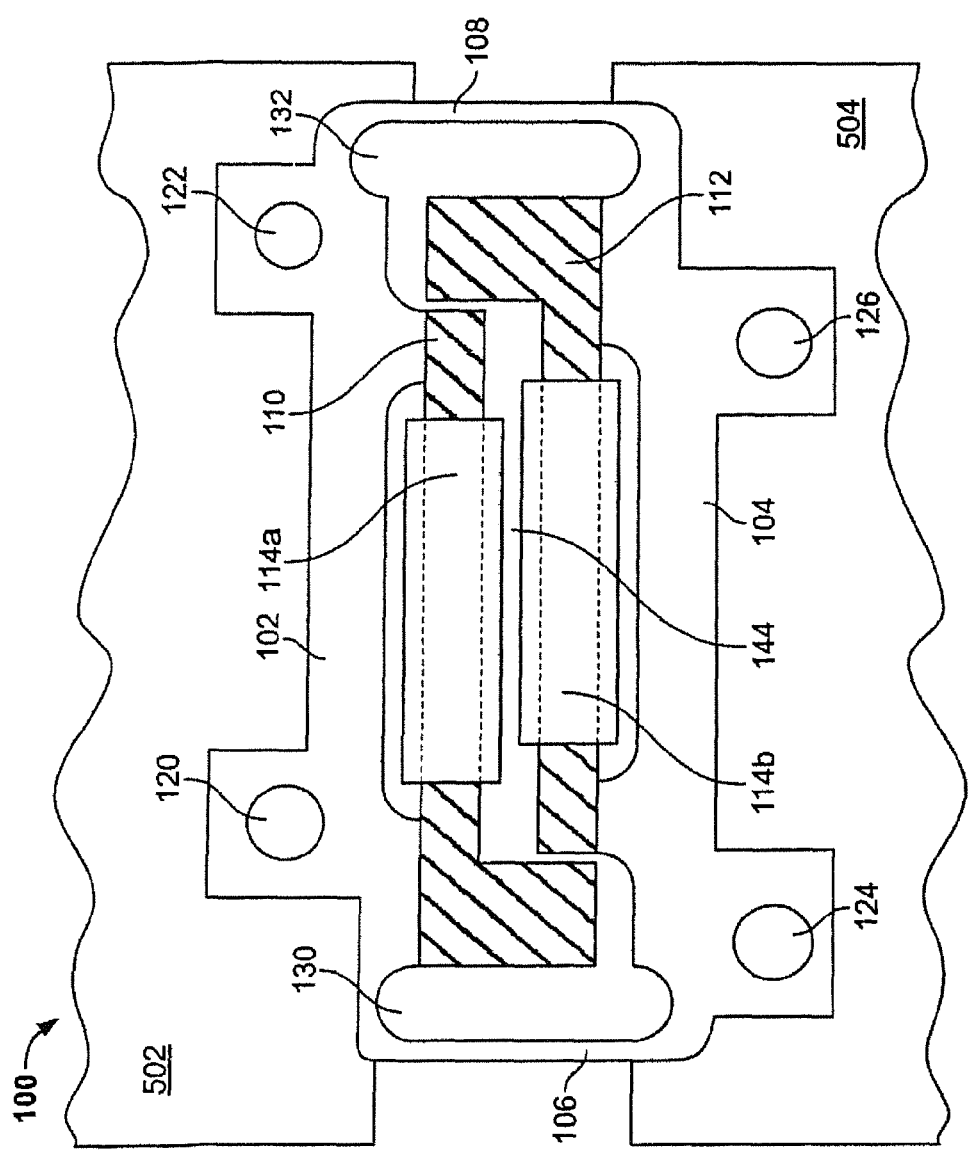
FIG. 24 is an elevational diagram of a system employing an actuator in accordance with one embodiment of the present invention.

FIG. 24 illustrates a system having an actuator 100 in accordance with one embodiment of the present invention. The system includes a case 502, a touch-sensitive panel 504, and an actuator 100. Actuator 100 includes two L-shaped pole pieces 110, 112, structural elements 102, 104, and biasing elements 106, 108. Pole pieces 110, 112 are further coupled to coils 114a, 114b to form magnetic devices. Coils 114a, 114b are coupled to one or more current sources for creating magnetic flux in pole pieces 110, 112. Biasing elements 106, 108 may be implemented as discussed above and may be made of elastic materials that may be compressed or stretched within a predefined range.

Referring to FIG. 24, one side of actuator 100 is coupled to the case 502 while another side of actuator 100 is coupled to the touch-sensitive panel 504. Structural element 102, as shown in FIG. 24, is fastened to the case 502. In this embodiment, the case 502 is rigid and does not move easily. In one embodiment, apertures 120, 122 may be used by fasteners to couple the structural element 102 to the case 502. Structural element 104 is, in turn fastened to a touch-sensitive panel 504. Touch-sensitive panel 504, in one embodiment, may be made of relatively flexible transparent materials. In one embodiment, holes 124, 126 may be used to fasten the structural element 104 to the touch-sensitive panel 504.

Figure 25:
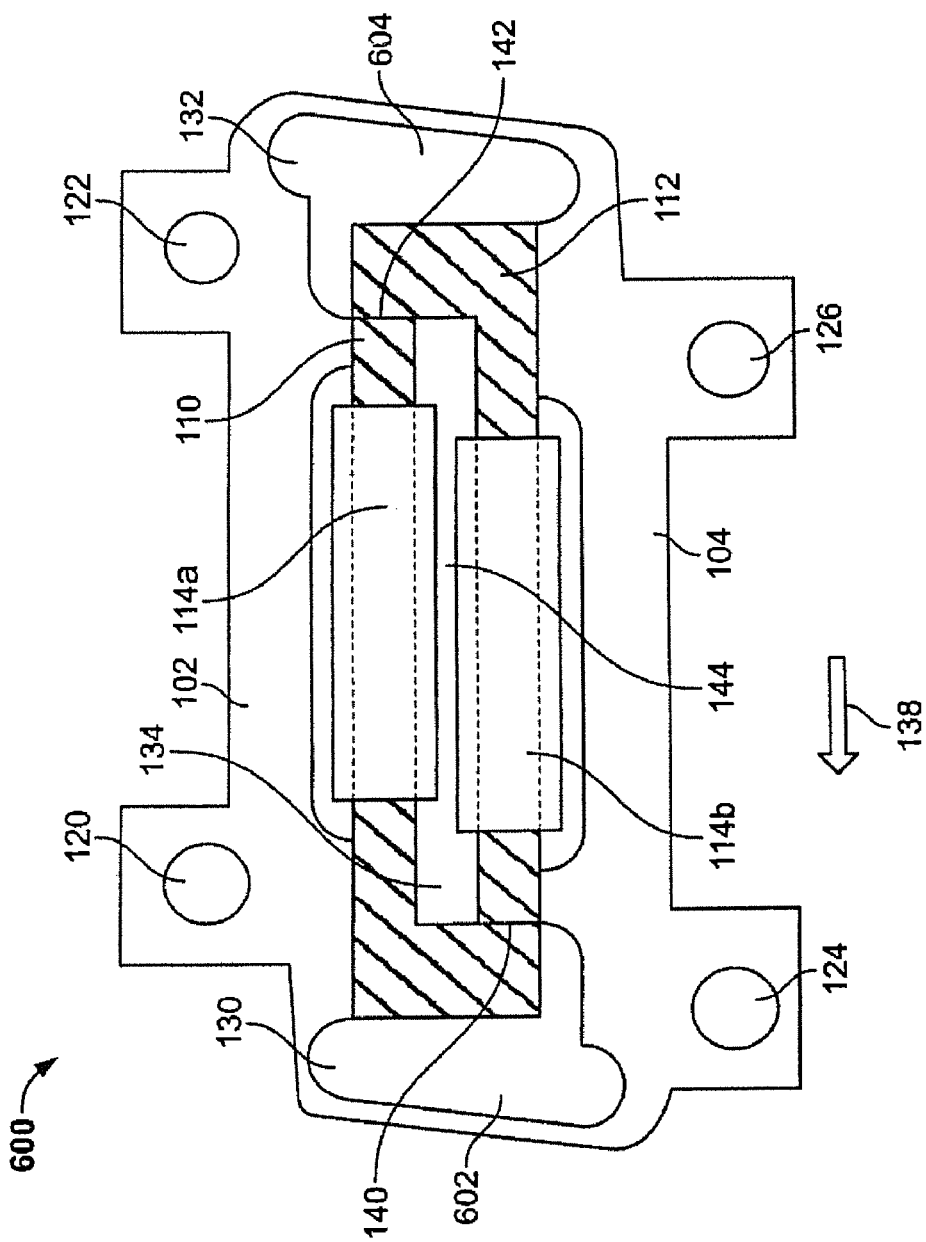
FIG. 25 is an elevational diagram illustrating a second equilibrium position of an actuator in accordance with one embodiment of the present invention.

When power is applied and input current begins to pass through the coils 114a, 114b, the attractive gap-closing force between pole pieces 110 and 112 starts to increase. The attractive force causes the pole piece 112 to be attracted to the pole piece 110 where pole piece 110 is held fixed. Pole piece 112 begins to move toward the pole piece 110 to close the gaps 140, 142 until it reaches a second equilibrium position as illustrated in FIG. 25. When power is reduced or removed, the attractive force between pole pieces 110 and 112 begins to reduce and consequently, the pole piece 112 begins to move back to its original position in response to the return force provided by the biasing elements 106, 108. The biasing elements 106, 108 continue to force the pole piece 112 to move back until it reaches the first equilibrium position as shown in FIG. 20. The movements between the pole pieces 110, 112 cause similar movements between the structural elements 102, 104. In one embodiment, the movements between the structural elements 102, 104 generate haptic effects or haptic sensation. Since touch-sensitive panel 504 is fastened to structural element 104, haptic effects on the touch-sensitive panel 504 occur when the movement between the structural elements 102, 104 occurs. Depending on the orientation of the actuator 100 with respect to the touch-sensitive panel 504, haptic effects may excite either in-plane or out-of-plane motion with respect to the touch-sensitive panel 504.

Figure 26:
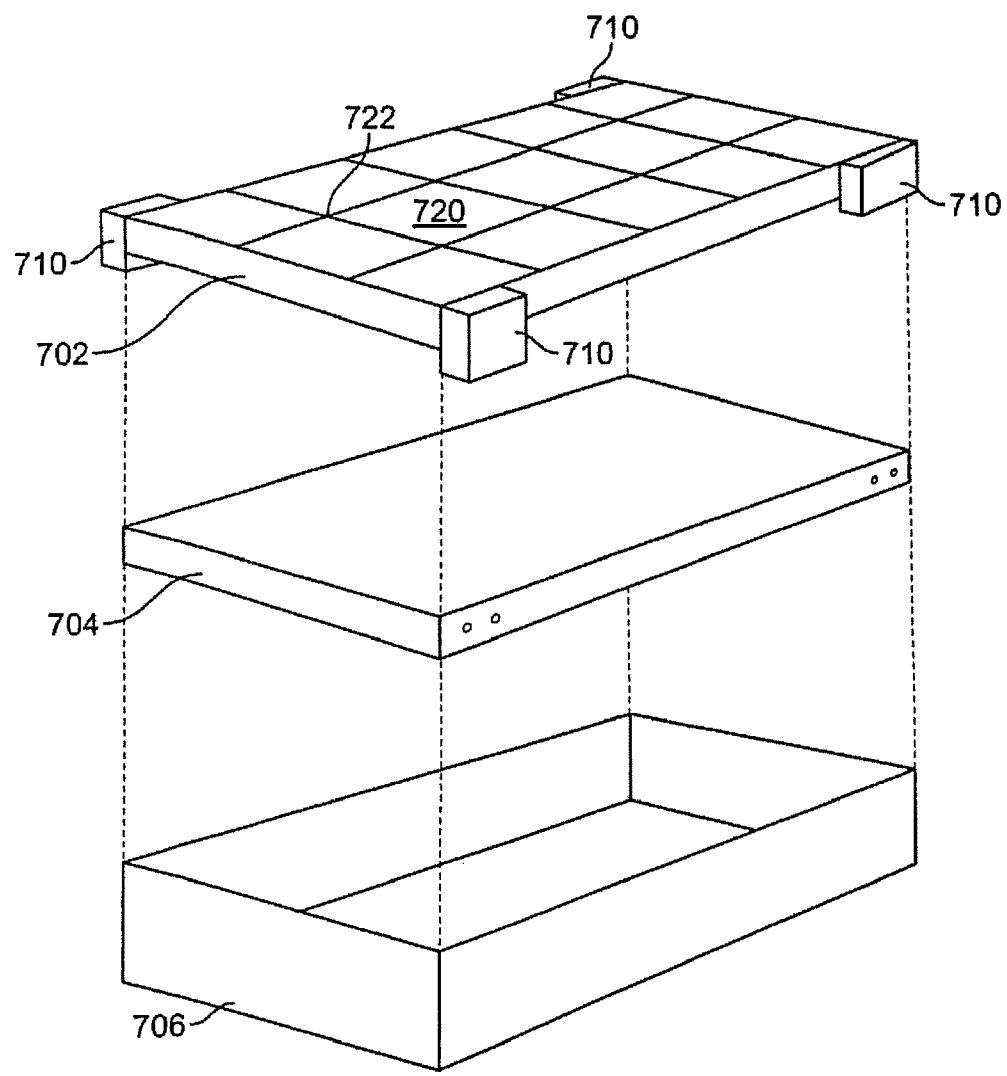
FIG. 26 is a front perspective diagram of a system configured with a plurality of actuators in accordance with one embodiment of the present invention.

FIG. 26 illustrates, in a somewhat exaggerated manner to improve visibility, a second equilibrium position of an actuator 600 in accordance with one embodiment of the present invention. Actuator 600, which is similar to actuator 100, includes two L-shaped pole pieces 110, 112, structural elements 102, 104, and biasing elements 602, 604. Pole pieces 110, 112 are further coupled to coils 114a, 114b to form magnetic devices. Coils 114a, 114b are coupled to one or more current sources for generating magnetic flux in pole pieces 110, 112.

When power is off, the biasing elements 602, 604 provide minimal force to keep the actuator 600 in the first equilibrium position as described and shown in FIG. 20. When power is on, the input current passes through the coils 114 and generates magnetic flux in the pole pieces 110, 112. Magnetic flux causes an attractive magnetic force between the pole pieces 110, 112 across gaps 140,142. The attractive magnetic force acts against the biasing elements 602, 604 and pulls the pole pieces 110, 112 closer together at the gaps 140, 142. Pole piece 110, in this embodiment, may be secured to a case via the structural element 102, while pole piece 112 is secured to a touch-sensitive panel via the structural element 104. The attractive magnetic force causes the pole piece 112 to move from right to left (as indicated by 138) toward the pole piece 110. When the pole piece 110 is displaced enough distance, a second equilibrium position is reached as shown in FIG. 25. When power is reduced or removed, the biasing elements 602, 604 force the pole piece 112 back to the first equilibrium position as discussed earlier.

FIG. 26 illustrates a system configuration having an actuator in accordance with one embodiment of the present invention. The system configuration includes a touch-sensitive panel or touch screen 702, a display panel 704, and a case 706. Touch-sensitive panel 702, in one embodiment, is made of substantially transparent materials, and is capable of transmitting light so that objects or images displayed in the display 704 may be seen through the touch-sensitive panel 702. The display 704 can be any type of display such as a cathode ray tube (CRT), liquid crystal display (LCD), plasma display, flat panel display or the like or could even be a static illustration. Both touch-sensitive panel 702 and display 704 may be installed in the case 706. In an alternative embodiment, the touch-sensitive panel 702 and the display 704 may be located separately with the actuator mounted between the touch-sensitive panel 702 and a relatively fixed location so that haptic effects are provided to the touch-sensitive panel but the display is located elsewhere.

In one embodiment, touch-sensitive panel 702 is further divided into various regions 720 and the regions are further separated by borders 722. Touch-sensitive panel 702 accepts a user's selection when only a region 720 is touched. Conversely, touch-sensitive panel 702 rejects a user's selection when a border 722 is touched. Touch-sensitive panel 702 further includes four actuators 710 and, depending on their orientation, actuators 710 can excite either in-plane or out-of-plane motion with respect to the touch-sensitive panel 702 for haptic sensation. Actuators 710 may be installed to move touch-sensitive panel for relative to display 704.

Figure 27:
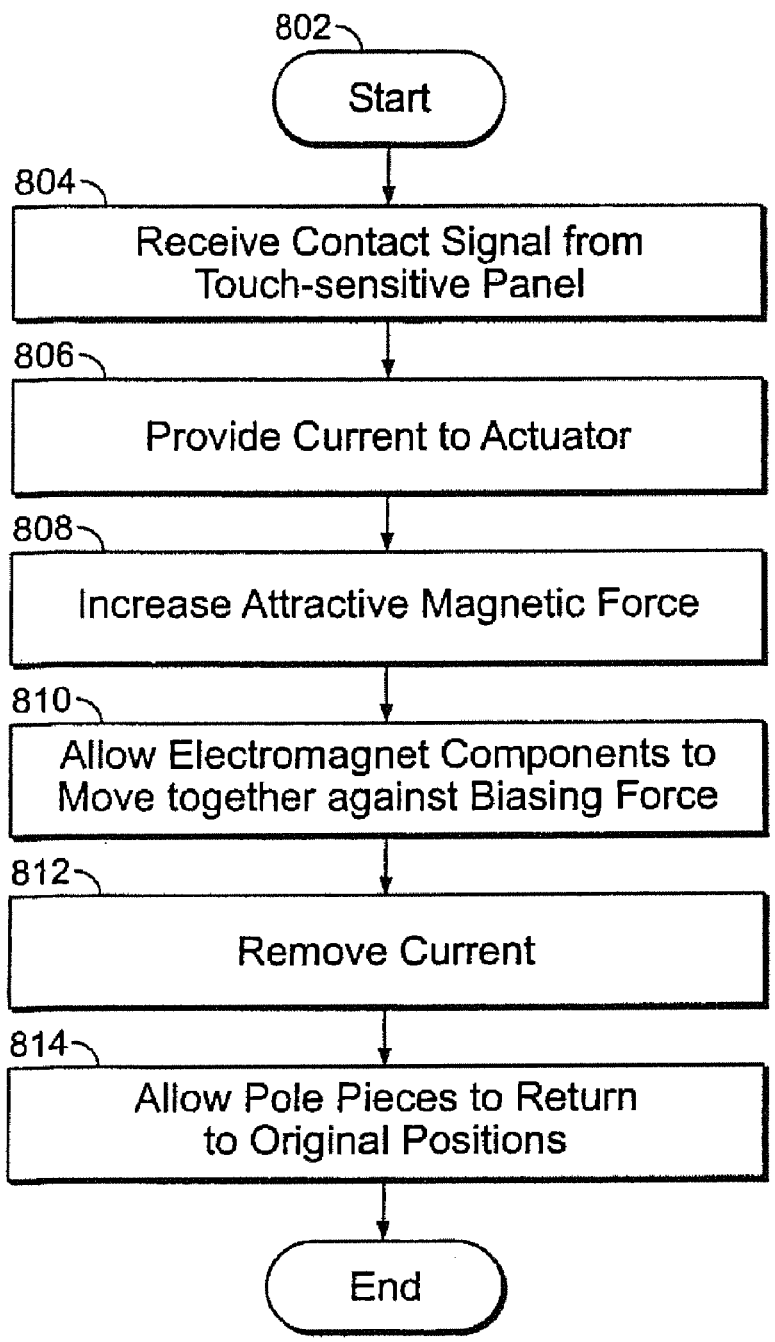
FIG. 27 is a flow diagram illustrating a method for generating haptic effects in accordance with one embodiment of the present invention.

FIG. 27 is a flow diagram illustrating a method for generating a haptic effect in accordance with one embodiment of the present invention. A process for generating haptic sensation starts at block 802. In one embodiment, the process can be activated by a user who touches a touch-sensitive panel possibly in a predetermined location or locations. In another embodiment, the process is activated by a touch signal or contact signal sent by the touch-sensitive panel, which indicates that a selection has been made by a user.

At block 804, the process receives a contact signal from the touch-sensitive, which may be sent by a touch-sensitive panel according to a selection made by a user. In another embodiment, a computer or controller sends a contact signal. Upon receipt of the contact signal, the process moves to the next block 806.

At block 806, the process instructs a controller to provide an input current according to the contact signal. In one embodiment, the input current is passing through at least one electromagnet device of an actuator to generate magnetic flux in a pair of pole pieces.

At block 808, the magnetic flux creates attractive magnetic force between the electromagnet devices which opposes a biasing force imparted by biasing elements arranged to counter the attractive magnetic force. The attractive magnetic force causes the pole pieces of the electromagnet devices to attract to each other. The process moves to the next block.

At block 810, the attractive magnetic force creates a movement between the electromagnet devices. In one embodiment, one pole piece of one electromagnet device is physically moved closer to another pole piece of another electromagnet device.

At block 812, the current is removed.

At block 814, a biasing element provides a bias force or return force to control the movement between the electromagnet devices within a predefined range. When the power is reduced or turned off in block 812, the pole pieces of electromagnet devices move back to their original positions.

With turning on and off the power continuously, a continuous movement between the electromagnet devices is created. Accordingly, the haptic effect is generated in response to the movement between the electromagnet devices. It should be noted that the frequency and amplitude of the movements between the electromagnet devices can be controlled by controlling the input current.

Figure 28:
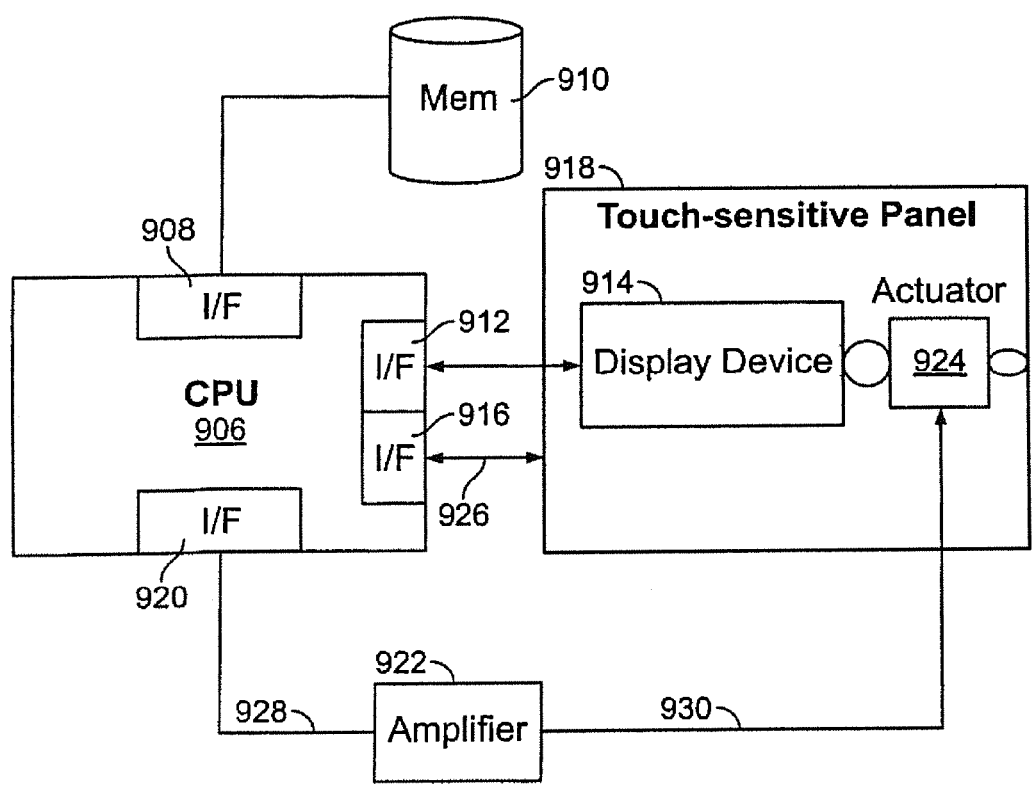
FIG. 28 is a block diagram illustrating a system having an actuator in accordance with one embodiment of the present invention.

FIG. 28 is a block diagram illustrating a system having an actuator in accordance with one embodiment of the present invention. The system includes a computer or central processing unit (CPU) 906 with appropriate interfaces 908 to a memory 910 for storing program steps for controlling the processor 906, 912 for controlling a display device 914, 916 for communicating with a touch-sensitive panel 918 and 920 for driving an amplifier circuit (if required) which in turn drives actuator 924. Actuator 924 is arranged to create relative movement between display device 914 and touch-sensitive panel 918. The relative movement may be in the plane of the touch-sensitive panel, out of the plane of the touch-sensitive panel, or same combination of the two. When the touch panel 904 is touched or depressed, it sends a contact signal to computer 906 via connection 926. The contact signal indicates that the touch panel has been selected or touched. Computer 906, which can be any general purpose computer operating under the control of suitable software and for firmware, is coupled to amplifier 922 via connection 928 and instructs amplifier 922 to provide input current to the actuator 924 over connection 930. Upon receipt of an instruction from the computer 906, amplifier 922 provides an input current to the actuator 924 via connection 930. Actuator 924 provides a haptic sensation or effect to the touch-sensitive panel 918. The processor 906 (or, potentially, another device (not shown) provides a display image or image to display device 914.

Figure 29:
FIGS. 29, 30 and 31 are diagrams illustrating areas of a touch input device which may be used for particular inputs.
Figure 30:
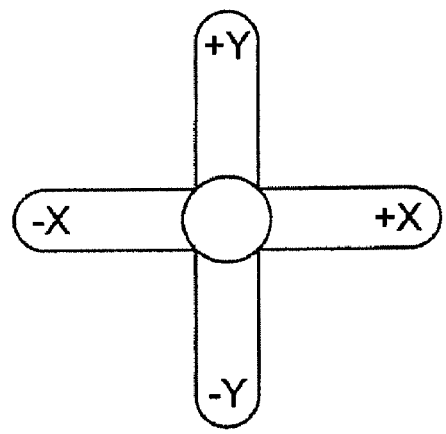
Figure 31:
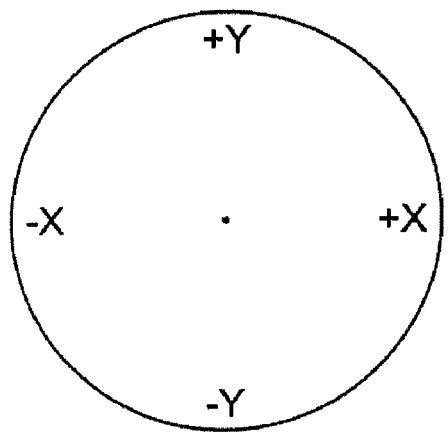

Turning finally to FIGS. 29, 30 and 31, these figures illustrate how areas of a touch pad and/or a touch screen or other similar touch input device may be utilized. In each of the figures areas of the touch sensitive surface of the touch input device are associated with particular inputs. In FIG. 29, a "+" area and a "−" area are provided. This could be used, for example, to zoom in (+) or zoom out (−) in a graphical environment having a pictorial representation of an image. FIG. 30 illustrates a version with "+X", "−X", "+Y" and "−Y" which could be used to translate an object or to rotate an object, or to otherwise interact with a graphically depicted object, as desired. Finally, FIG. 31 provides a similar arrangement to that shown in FIG. 30, however, intermediate values (e.g., some −X and some +Y at the same time) may be input in an intuitive manner. In some embodiments, these areas along with some indication as to what they are intended to control at a given point in time may be displayed on a touch screen and haptic feedback provided to the user indicative of rates of input, boundaries and similar conditions in the graphical environment, and the like.

While this invention has been described in terms of several preferred embodiments, it is contemplated that alterations, permutations, and equivalents thereof will become apparent to those skilled in the art upon a reading of the specification and study of the drawings. For example, many different types of actuators can be used to output tactile sensations to the user. Furthermore, many of the features described in one embodiment can be used interchangeably with other embodiments. Furthermore, certain terminology has been used for the purposes of descriptive clarity, and not to limit the present invention. The invention, therefore, is not to be restricted except in the spirit of the appended claims.

What is claimed is:

1. A haptic feedback touch control for inputting signals to a computer and for outputting forces to a user of the touch control, the touch control comprising:
   a touch input device including a touch screen operative to input a position signal to a processor of said computer based on a location on said touch screen which said user contacts; and
   at least one actuator coupled to said touch screen, said actuator outputting a force to move said touch screen to provide a haptic sensation to said user contacting said touch screen, wherein said actuator outputs said force based on a first single-discontinuity waveform, wherein the first single-discontinuity waveform is associated with a simulation of one of a button press, and a second single-discontinuity waveform, wherein the second single-discontinuity waveform is associated with a simulation of a button release, wherein the actuator comprises:
   a first structural element having mounting structure mountable to a first component;
   a second structural element having mounting structure mountable to a second component;
   a first biasing element coupling the first structural element to the second structural element;
   a first magnetic device carried by the first structural element, the first magnetic device including a first pole piece;
   a second magnetic device carried by the second structural element, the second magnetic device including a second pole piece; and
   a first coil disposed about at least one of said first pole piece and said second pole piece;
   wherein the first biasing element is arranged to provide a biasing force opposing an attractive magnetic force urging the first and second pole pieces together when current is applied to the first coil and electric current applied to the first coil causes a haptic effect to be generated between the first component on the second component.

2. The haptic feedback touch control of claim 1, wherein the first and single-discontinuity waveforms are different from one another.

3. The haptic feedback touch control of claim 1, wherein the first and second single-discontinuity waveforms are substantially identical to one another.

4. The haptic feedback touch control of claim 1, wherein the first single-discontinuity waveform is symmetrical.

5. The haptic feedback touch control of claim 1, wherein the first single-discontinuity waveform is asymmetrical.

6. The haptic feedback touch control of claim 1, wherein said contact is effected by a body portion of the user.

7. The haptic feedback touch control of claim 1, wherein said contact is effected by a stylus manipulated by the user.

8. The haptic feedback touch control of claim 1, wherein the second magnetic device includes a second coil disposed about at least one of said first pole piece and said second pole piece.

9. The haptic feedback touch control of claim 1, further comprising a second biasing element, wherein the second biasing element is arranged to provide a biasing force opposing an attractive magnetic force urging the first and second pole pieces together when current is applied to the first coil.

10. The haptic feedback touch control of claim 1, wherein the first biasing element comprises a spring.

11. The haptic feedback touch control of claim 1, wherein the first biasing element comprises an elastomeric element.

12. The haptic feedback touch control of claim 1, wherein the first biasing element comprises a foam material.

13. The haptic feedback touch control of claim 1, wherein the first and second structural element and the first biasing element are all formed from the same material and the first biasing element is formed thinner than the first and second structural elements so that it is free to flex when perturbed.

14. A haptic feedback touch control for inputting signals to a computer and for outputting forces to a user of the touch control, the touch control comprising:
   a touch input device including a touch surface operative to input a position signal to a processor of said computer based on a location on said touch surface which said user contacts, said location being associated with a location of a cursor displayed on a display screen upon which a graphical object is also displayed; and
   at least one actuator coupled to said touch input device, said actuator outputting a force on said touch input device to provide a haptic sensation to said user contacting said touch surface, wherein said actuator outputs said force as long as the location of the cursor on the display screen assumes a predetermined relationship with the location of the graphical object on the display screen;
   wherein the actuator comprises:
   a first structural element having mounting structure mountable to a first component;
   a second structural element having mounting structure mountable to a second component;
   a first biasing element coupling the first structural element to the second structural element;
   a first magnetic device carried by the first structural element, the first magnetic device including a first pole piece;
   a second magnetic device carried by the second structural element, the second magnetic device including a second pole piece; and
   a first coil disposed about at least one of said first pole piece and said second pole piece;
   wherein the first biasing element is arranged to provide a biasing force opposing an attractive magnetic force urging the first and second pole pieces together when current is applied to the first coil and electric current applied to the first coil causes a haptic effect to be generated between the first component on the second component.

15. The haptic feedback touch control of claim 14, wherein the predetermined relationship is coincidence of location.

16. The haptic feedback touch control of claim 14, wherein the second magnetic device includes a second coil disposed about at least one of said first pole piece and said second pole piece.

17. The haptic feedback touch control of claim 14, further comprising a second biasing element, wherein the second biasing element is arranged to provide a biasing force opposing an attractive magnetic force urging the first and second pole pieces together when current is applied to the first coil.

18. The haptic feedback touch control of claim 14, wherein the first biasing element comprises a spring.

19. The haptic feedback touch control of claim 14, wherein the first biasing element comprises an elastomeric element.

20. The haptic feedback touch control of claim 14, wherein the first biasing element comprises a foam material.

21. The haptic feedback touch control of claim 14, wherein the first and second structural element and the first biasing element are all formed from the same material and the first biasing element is formed thinner than the first and second structural elements so that it is free to flex when perturbed.

22. A device for providing haptic feedback representative of the extent to which a scrolling action triggered by manipulation of a cursor relative to a graphical object displayed on a display screen is occurring comprising:
  means for associating the location of the cursor displayed on a touch screen with a contact location on the touch screen; and
  means for providing haptic feedback by way of the touch screen, said haptic feedback being continuously applied based on and during a scrolling action;
  wherein the means for providing haptic feedback by way of the touch screen comprises:
    a first structural element having mounting structure mountable to a first component;
    a second structural element having mounting structure mountable to a second component;
    a first biasing element coupling the first structural element to the second structural element;
    a first magnetic device carried by the first structural element, the first magnetic device including a first pole piece;
    a second magnetic device carried by the second structural element, the second magnetic device including a second pole piece; and
    a first coil disposed about at least one of said first pole piece and said second pole piece;
    wherein the first biasing element is arranged to provide a biasing force opposing an attractive magnetic force urging the first and second pole pieces together when current is applied to the first coil and electric current applied to the first coil causes a haptic effect to be generated between the first component on the second component.

23. A device for providing haptic feedback in response to a manipulation of a graphical object, comprising:
  means for correlating a characteristic of the manipulation of the graphical object displayed on a touch screen with a characteristic of a contact of the touch screen; and
  means for imparting a force to the touch screen at an extent which varies in accordance with the characteristic of the manipulation;
  wherein the means for imparting a force to the touch screen comprises:
    a first structural element having mounting structure mountable to a first component;
    a second structural element having mounting structure mountable to a second component;
    a first biasing element coupling the first structural element to the second structural element;
    a first magnetic device carried by the first structural element, the first magnetic device including a first pole piece;
    a second magnetic device carried by the second structural element, the second magnetic device including a second pole piece; and
    a first coil disposed about at least one of said first pole piece and said second pole piece;
    wherein the first biasing element is arranged to provide a biasing force opposing an attractive magnetic force urging the first and second pole pieces together when current is applied to the first coil and electric current applied to the first coil causes a haptic effect to be generated between the first component on the second component.

24. A haptic feedback touch control for inputting signals to a computer and for outputting forces to a user of the touch control, the input signals manipulating a graphical object, the touch control comprising:
  a touch input device including a touch screen operative to input a position signal to a processor of said computer based on a location on said touch screen which said user contacts; and
  at least one actuator coupled to said touch screen, said actuator outputting a force on said touch screen to provide a haptic sensation to said user contacting said touch screen, said force being a function of a characteristic of the manipulation of a graphical object, which is a function of a characteristic of the contact by said user;
  wherein the characteristic of the manipulation is an acceleration or a deceleration and wherein the force that is output varies in accordance with variations of the one or more of accelerations or deceleration,
  wherein the actuator comprises:
    a first structural element having mounting structure mountable to a first component;
    a second structural element having mounting structure mountable to a second component;
    a first biasing element coupling the first structural element to the second structural element;
    a first magnetic device carried by the first structural element, the first magnetic device including a first pole piece;
    a second magnetic device carried by the second structural element, the second magnetic device including a second pole piece; and
    a first coil disposed about at least one of said first pole piece and said second pole piece;
    wherein the first biasing element is arranged to provide a biasing force opposing an attractive magnetic force urging the first and second pole pieces together when current is applied to the first coil and electric current applied to the first coil causes a haptic effect to be generated between the first component on the second component.

25. The haptic feedback touch control of claim 24, wherein the force is repetitive and increases in frequency and/or magnitude with said acceleration or deceleration.

26. The haptic feedback touch control of claim 24, wherein the force is repetitive and increases in frequency and/or magnitude based on the characteristic of the manipulation.

27. The haptic feedback touch control of claim 24, wherein the graphical object assumes multiple forms, and the characteristic of said manipulation is the rate at which said forms are assumed.

28. The haptic feedback touch control of claim 27, wherein the force is repetitive and increases in frequency and/or magnitude based on said rate.

29. The haptic feedback touch control of claim 24, wherein said graphical object is a scroll bar.

30. The haptic feedback touch control of claim 24, wherein said characteristic of a contact is the location of the contact.

31. The haptic feedback touch control of claim 24, wherein said characteristic of a contact is pressure imparted by the contact.

32. The haptic feedback touch control of claim 24, wherein the second magnetic device includes a second coil disposed about at least one of said first pole piece and said second pole piece.

33. The haptic feedback touch control of claim 24, further comprising a second biasing element, wherein the second biasing element is arranged to provide a biasing force opposing an attractive magnetic force urging the first and second pole pieces together when current is applied to the first coil.

34. The haptic feedback touch control of claim 24, wherein the first biasing element comprises a spring.

35. The haptic feedback touch control of claim 24, wherein the first biasing element comprises an elastomeric element.

36. The haptic feedback touch control of claim 24, wherein the first biasing element comprises a foam material.

37. The haptic feedback touch control of claim 24, wherein the first and second structural element and the first biasing element are all formed from the same material and the first biasing element is formed thinner than the first and second structural elements so that it is free to flex when perturbed.

* * * * *